United States Patent
Klein et al.

(10) Patent No.: US 10,656,305 B2
(45) Date of Patent: May 19, 2020

(54) METHOD AND APPARATUS FOR SIMULATING SPECTRAL INFORMATION OF GEOGRAPHIC AREAS

(71) Applicant: The Boeing Company, Chicago, IL (US)

(72) Inventors: Robert J. Klein, Ballwin, MO (US); Pamela L. Blake, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 620 days.

(21) Appl. No.: 15/201,136

(22) Filed: Jul. 1, 2016

(65) Prior Publication Data

US 2018/0003857 A1    Jan. 4, 2018

(51) Int. Cl.
*G06K 9/00* (2006.01)
*G01V 99/00* (2009.01)
*G01J 3/28* (2006.01)
*G06K 9/46* (2006.01)

(52) U.S. Cl.
CPC ......... *G01V 99/005* (2013.01); *G06K 9/0063* (2013.01); *G01J 3/28* (2013.01); *G01J 3/2823* (2013.01); *G01J 2003/2826* (2013.01); *G06K 2009/4657* (2013.01)

(58) Field of Classification Search
None
See application file for complete search history.

(56) References Cited

U.S. PATENT DOCUMENTS

| 5,495,562 A * | 2/1996 | Denney .................. F41G 7/004 345/421 |
| 6,735,557 B1 | 5/2004 | Castellar et al. |
| 6,958,466 B1 | 10/2005 | Stein |
| 7,491,944 B1 * | 2/2009 | Stork .................... G01J 3/2823 250/390.07 |
| 8,483,425 B2 * | 7/2013 | Guo ......................... G06T 7/12 348/143 |

(Continued)

FOREIGN PATENT DOCUMENTS

| EP | 2704100 | 3/2014 |
| WO | 2000002156 | 1/2000 |

OTHER PUBLICATIONS

E. J. Ientilucci, and S. D. Brown, "Advances in Wide Area Hyperspectral Image Simulation" pp. 110-121, SPIE (Year: 2003).*

(Continued)

*Primary Examiner* — Kibrom K Gebresilassie
(74) *Attorney, Agent, or Firm* — Gates & Cooper LLP

(57) ABSTRACT

A method and apparatus for simulating spectral representation of a region of interest is disclosed. In one embodiment, the method comprises determining a physical characteristic of a geospatial portion of the region of interest, associating the determined physical characteristic with a material of a spectral library, the spectral library having at least one spectral definition material, associating the spectral definition of the material with the geospatial portion of the region of interest, wherein the material is at least partially representative of the geospatial section of the region of interest, and generating the simulated spectral representation of the region of interest at least in part from at least the associated spectral definition of the at least one material.

17 Claims, 23 Drawing Sheets

(56) References Cited

U.S. PATENT DOCUMENTS

| | | | |
|---|---|---|---|
| 8,503,050 B2* | 8/2013 | Morikawa | H04N 1/0305 358/461 |
| 8,659,656 B1 | 2/2014 | Cruz-Albrecht et al. | |
| 8,682,079 B1* | 3/2014 | Ouzounis | G06K 9/00637 382/190 |
| 8,995,722 B2 | 3/2015 | Flanders et al. | |
| 9,213,915 B2 | 12/2015 | Sommese et al. | |
| 2009/0257622 A1* | 10/2009 | Wolowelsky | G01N 21/3518 382/103 |
| 2010/0066740 A1* | 3/2010 | Wang | G01C 11/00 345/420 |
| 2010/0078561 A1* | 4/2010 | Gorin | G01N 21/3504 250/338.5 |
| 2010/0328659 A1 | 12/2010 | Bodkin | |
| 2010/0329529 A1* | 12/2010 | Feldman | G06K 9/6252 382/131 |
| 2011/0081040 A1* | 4/2011 | Conger | G01J 3/42 382/100 |
| 2012/0307113 A1* | 12/2012 | Peles | H04N 5/262 348/239 |
| 2014/0019166 A1* | 1/2014 | Swanson | G06Q 40/08 705/4 |
| 2015/0379431 A1* | 12/2015 | Stokes | G06T 17/05 706/11 |
| 2017/0323460 A1* | 11/2017 | Carney | H04N 17/002 |
| 2018/0005011 A1* | 1/2018 | Klein | G06K 9/0063 |
| 2018/0285640 A1* | 10/2018 | Brown | G06K 9/00637 |

OTHER PUBLICATIONS

Shippert, P., "Introduction to Hyperspectral Image Analysis", last accessed Jul. 20, 2016. http://spacejournal.ohio.edu/pdf/shippert.pdf.

Extended European Search Report dated Nov. 7, 2017 for European Patent Application No. 17179165.0.

Ientilucci, E., et al., "Advances in Wide Area Hyperspectral Image Simulation", Targets and Backgrounds IX: Characterization and Representation, Proceedings of SPIE, 2003, pp. 110-121, vol. 5075.

Borel, C.C., et al., "Multi- and hyperspectral scene modeling", Algorithms and Technologies for Multispectral, Hyperspectral, and Ultraspectral Imagery XVII, Proc. of SPIE, 2011, pp. 1-9, vol. 8048, No. 1.

Borner, A., et al., "SENSOR: a tool for the simulation of hyperspectral remote sensing systems", ISPRS Journal of Photogrammetry and Remote Sensing, Mar. 1, 2001, pp. 299-312, vol. 55, No. 1-6.

European Examination Report dated Feb. 19, 2019 for European Patent Application No. 17179165.0.

* cited by examiner

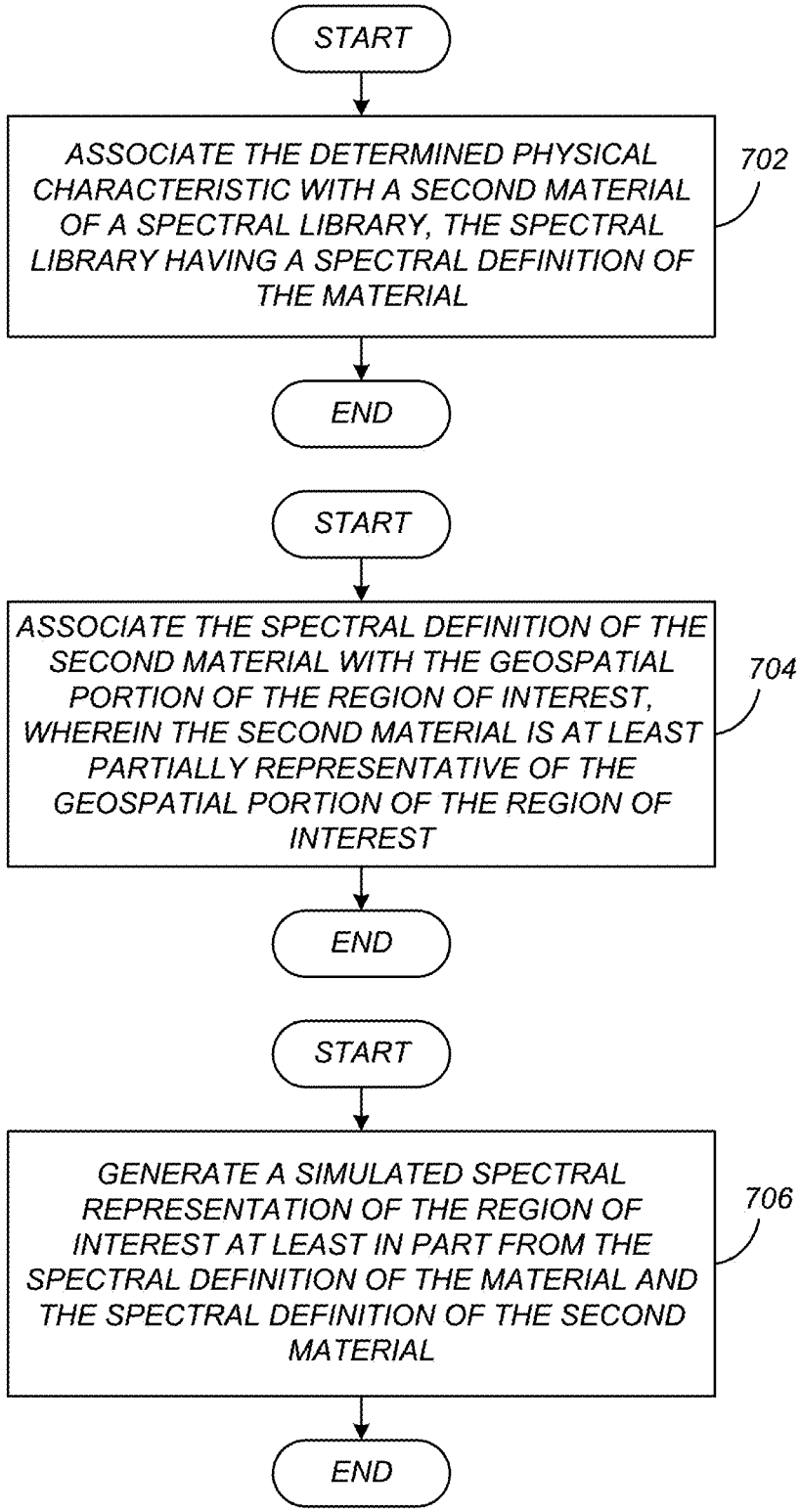

METHOD AND APPARATUS FOR SIMULATING SPECTRAL INFORMATION OF GEOGRAPHIC AREAS

CROSS-REFERENCE TO RELATED APPLICATIONS

Application Ser. No. 15/201,137, entitled "METHOD AND APPARATUS FOR USING A REGIONALLY SPECIFIC SPECTRAL MODEL TO IDENTIFY THE SPECTRAL BANDS FOR USE FOR ISOLATING REMOTELY SENSED MATERIALS OF INTEREST," filed on Jul. 1, 2016, by Robert J. Klein and Anthony W. Baker, issued Oct. 9, 2019 as U.S. Pat. No. 10,462,389; and Application Ser. No. 15/201,141, entitled "METHOD AND APPARATUS FOR ON-BOARD SELECTION OF BANDS OF A HYPERSPECTRAL SENSOR BASED ON SIMULATED SPECTRAL REPRESENTATION OF THE REGION OF INTEREST," filed on Jul. 1, 2016, by Robert J. Klein and Shane D. Arnott, issued May 2, 2018 as U.S. Pat. No. 9,977,962.

BACKGROUND

1. Field

The present disclosure relates to systems and methods for collecting spectral information from geographic areas, and in particular to a system and method for simulating spectral information of geographic areas.

2. Description of the Related Art

Mobile surveillance platforms are a rich source of geographical data. Such mobile platforms may include satellites in low-earth orbits (LEO), medium earth orbits (MEO), or geosynchronous/geostationary orbits. Mobile platforms use one or more sensors to collect geographical data. These sensors have a wide variety of sensor characteristics, including bandwidth, wavelengths resolution, and sensing technique, depending upon the application and information desired.

With regard to sensing techniques, the mobile surveillance platform sensor(s) 104 may be passive (e.g. simply sense energy emitted from targets) or may be active (e.g. where the energy sensed by the sensor is provided by a man-made energy source or illuminator). With regard to wavelengths, sensors may operate in a variety of bandwidths including gamma ray bandwidths, x-ray, ultraviolet, visual, infrared, and radio wave. Sensor resolution may be defined in terms of spatial resolution (e.g. the pixel size of an image representing the area of the surveilled surface as determined by the sensors' instantaneous field of view; spectral resolution (e.g. the resolution of the wavelength and number of wavelength intervals), temporal resolution (e.g. the time period between measurements), radiometric resolution (e.g. the effective bit depth or dynamic range of the sensor), and geometric resolution.

In many cases, mobile surveillance platforms are used to search for and find "target" geographical features in a particular area. For example, a mobile surveillance platform may be used to determine the extent of damage caused by a recent forest fire. In such cases, the sensor characteristics are usually chosen to maximize discriminants between the "target" and the background. Because the characteristics of the target and the background are typically not known apriori, this can be problematic, particularly with mobile surveillance platforms, especially those mobile platforms that cannot be remotely configured in real or near real time.

One potential solution to this problem is to use hyperspectral imagers. Like other sensors or sensor suites, hyperspectral imagers collect and process data from across the electromagnetic wave spectrum. But unlike other multispectral imagers (which measure radiation reflected from a surface at a few wide, separated wavelength bands) hyperspectral imagers measure reflected radiation at a series of narrow and (typically) contiguous wavelength bands. This permits the gathering of more detailed spectral information which can provide much more information about the surface than a multispectral pixel spectrum and can reduce the guesswork in choosing how to best spectrally configure the mobile surveillance platform sensor to collect information of interest.

However, this solution can severely stress hyperspectral imaging processing requirements on the mobile surveillance platform and/or bandwidth and latency requirements of the communication link between the mobile surveillance platform and the base station. Furthermore, while hyperspectral sensing might ease the planning of which spectral bands to collect, they do not solve and may well worsen sensor resolution and update concerns.

What is needed is a system and method for accurately simulating the spectral information of a particular geographic area of interest, and intelligently configuring remote sensors to collect and/or process desired geospatial data. The methods and systems described herein satisfy that need.

SUMMARY

To address the requirements described above, this document discloses a system and method for simulating spectral representation of a region of interest. In one embodiment, the method comprises determining a physical characteristic of a geospatial portion of the region of interest, associating the determined physical characteristic with a material of a spectral library, the spectral library having at least one spectral definition material, associating the spectral definition of the material with the geospatial portion of the region of interest, wherein the material is at least partially representative of the geospatial section of the region of interest, and generating the simulated spectral representation of the region of interest at least in part from at least the associated spectral definition of the at least one material.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIGS. 7A-7C are diagrams depicting exemplary operations that can be used to simulate the spectral information of geographic areas in which a second material is present in the geospatial portion;

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

This specification describes three primary embodiments of a method and system for generating and using simulated spectral representation of a geographical region of interest.

In a first embodiment, a simulated spectral representation of a geographical area (optionally, as sensed by a sensor having particular sensor characteristics) is generated by determining the GIS data about the area of interest, correlating that GIS data to one or more materials defined spectrally within a spectral library, associating the spectral definition of a material correlated to the material of the GIS data with particular regions of the map defined by the GIS data. This simulated spectral data can be used to configure a sensor system to get the desired data without incurring the expense of reconfiguring the sensor based on actual sensor measurements.

In a second embodiment, the foregoing simulated spectral representation is used to identify the best spectral bands to use for isolation of a material of interest in remotely sensing and processing geographical data. The above-described GIS data and spectral library information to make it allow the accurate and rapid configuration of such remote sensors for specific geographic regions and land cover related conditions, optimizing collection of information regarding specified target materials of interest. In this second embodiment, specific post-collection analysis of the resulting sensor imagery may be recommended to identify the target material(s). This permits mission-specific objectives to be met with a reduced capability sensor system (one that meets the mission objectives over the region of interest) and can reduce system complexity.

In a third embodiment, information created from a GIS-based spectral model is applied to a platform with a hyperspectral sensor. This on-platform software solution determines which wavelengths are optimal for identifying a target material or materials remotely, slices or selects bands at those wavelengths from the hyperspectral data cube of data provided by the hyperspectral sensor, and transmits only those bands to a ground station. Because the bands are identified using the large area spectral model described above, the bands that are selected can change dynamically based on the area the platform is imaging. Additionally, the analysis of the isolated bands can be performed on board the collection platform and results transmitted. This ameliorates the requirement to transmit large datasets to the ground station, as only data in those selected bands of interest are transmitted.

Remote Sensing System

Figure 1:
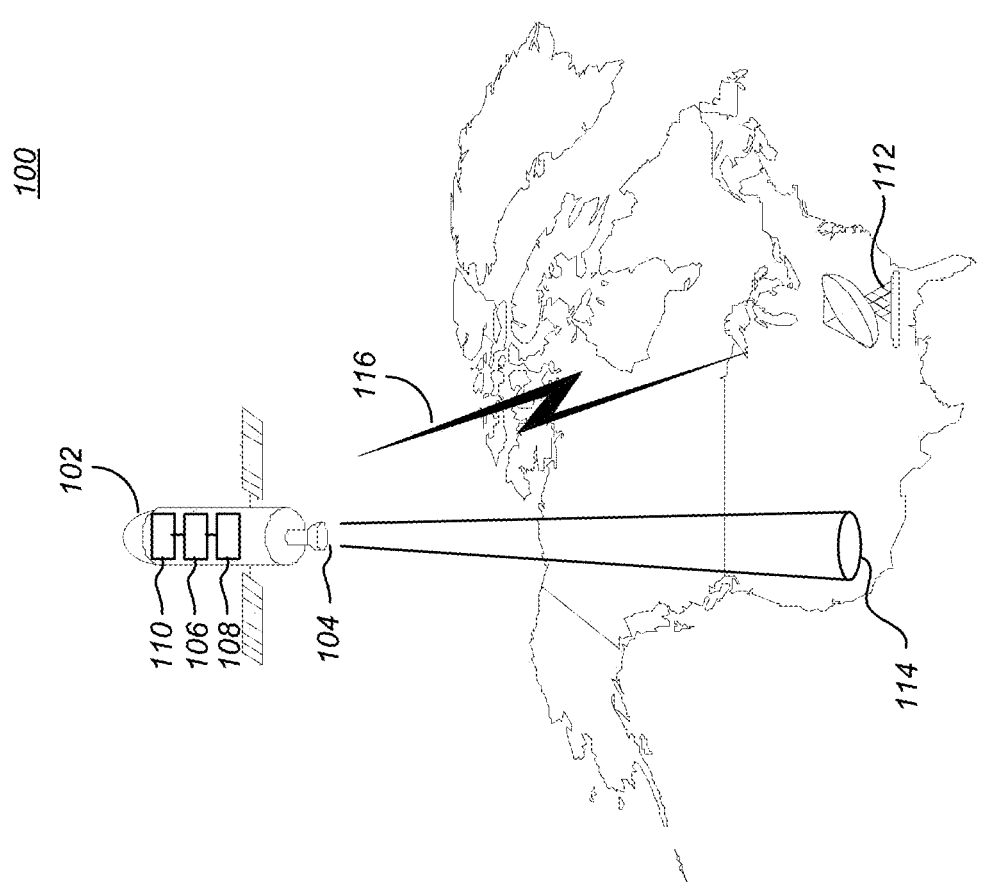
FIG. 1 is a diagram depicting one embodiment of a remote sensing system using a mobile surveillance platform.

FIG. 1 is a diagram depicting one embodiment of a remote sensing system 100 using a mobile surveillance platform 102. In the illustrated embodiment, the mobile surveillance platform 102 (hereinafter alternately referred to as "platform") is a satellite; however, the surveillance platform may be comprised of an aircraft, watercraft, or remotely piloted vehicle. The platform 102 includes one or more sensors 104 (hereinafter simply referred to as "sensor") for remotely sensing electromagnetic energy emanating from a surface region of interest (ROI) 114. Although the ROI illustrated in FIG. 1 appears elliptical or circular, it may be of any shape. The sensors 104 may include imaging or non-imaging sensors that operate in a broad range of spectral bands including gamma ray, x-ray, ultraviolet bands, visual, infrared bandwidths, and radio wave bands, and may be passive, active, or semi-active (e.g. sense energy illuminated by another element of the remote sensing system 100).

The platform 102 also includes a processor 106 communicatively coupled to the sensor 104, a memory 108 and a communications module 110. Using processor instructions stored in the communicatively coupled memory 108, the processor receives data from the sensors 104, and provides the data for communication to the ground station 112 via the communications module 110 and communications link 116. The processor 106 may process the sensor data before transmission, or may simply reformat the data for transmission. The communications module 110 may also receive commands and messages from the base station 112 and provide those commands and messages to the processor 106, and may transmit commands from the platform 102 to the base station 112.

Although the illustrated platform 102 comprises a satellite, the platform 102 may comprise a spacecraft, aircraft, watercraft, or remotely piloted vehicle (RPV) of any type.

GIS System

Geographic information systems (GIS) comprise computer based tools for assembling, storing, manipulating, and displaying geographically-referenced, spatially distributed data. Such systems are useful, for example, in the management of resources, scientific investigations of the Earth's surface, asset planning and locating, criminology, demographic studies, disaster management, urban planning, and environmental impact assessments.

Typically, GIS systems accept and use many forms of data, so long as the data is geo-referenceable (e.g. referenceable to a location). Such locations can be expressed in different ways, including latitude and longitude, zip code, or geopolitical borders. The data may include information about land features, such as the type of soil, vegetation, the location of streams, lakes and other bodies of water, and can include information about natural and man made features. The data may also include population or other demographic data.

GIS systems accept such data (which may come from a number of different sources), manipulates the data (for example, to account for spatial distortions and perspectives), scale the data to account for different scales, and align known data points so that the data from different sources can be combined. GIS systems can layer data from different sources to produce a wide variety of individual maps.

Figure 2:
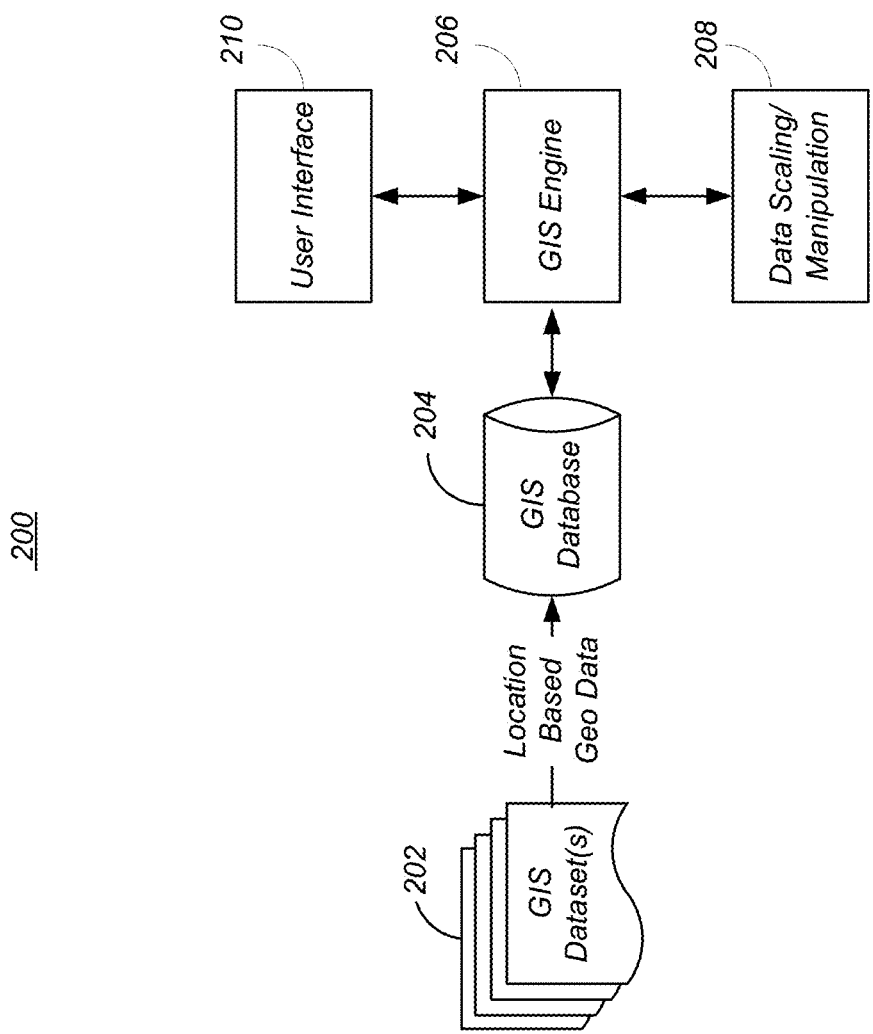
FIG. 2 is a diagram of an exemplary global information system.

FIG. 2 is a diagram of an exemplary GIS system 200. The GIS system 200 comprises a GIS database 204 that stores location-based geographical data from one or more GIS datasets 202 or other data sources 202. A GIS engine 206 retrieves and processes the data stored in the GIS database 204 according to commands from a user interface 210, and presents the results to users via the user interface 210. Data scaling, manipulation, and data layering can be performed in a data processing module 208 communicatively coupled to the GIS engine. Scaled, manipulated, and layered data may also be stored in the GIS database for rapid retrieval and further analysis.

The systems and method disclosed herein use such GIS data to plan and execute the collection of sensor data.

Simulating Spectral Information of Geographic Areas

In the discussion below, a method and apparatus for fusing spectral library information with physical geospatial data is disclosed. This physical geospatial data is used to simulate the spectral information of a region of interest. The physical geospatial data can include, for example, land use/land cover (LULC) information, soils information, and built up area (BUA) information.

The spectral library information includes reflectance information for a variety of materials, which can range from green grass to a specific shade of paint on steel. Such libraries are created using mass spectrometers, and are available from such agencies as the United States Geological Service (USGS) and the Jet Propulsion Library (JPL). The spectral library information, once fused into the physical geospatial data, allows the spectral content of the region of interest to be simulated. As further discussed below, such simulations can be used to predict the effectiveness of a sensor 104 configured to target a certain material in the region of interest 114. This predicted effectiveness can be used to configure the sensor 104 and associated processors 106 to detect and discriminate target materials by their predicted spectrum as compared to the predicted spectrum of other (background) materials in the region of interest 114.

Figure 3:
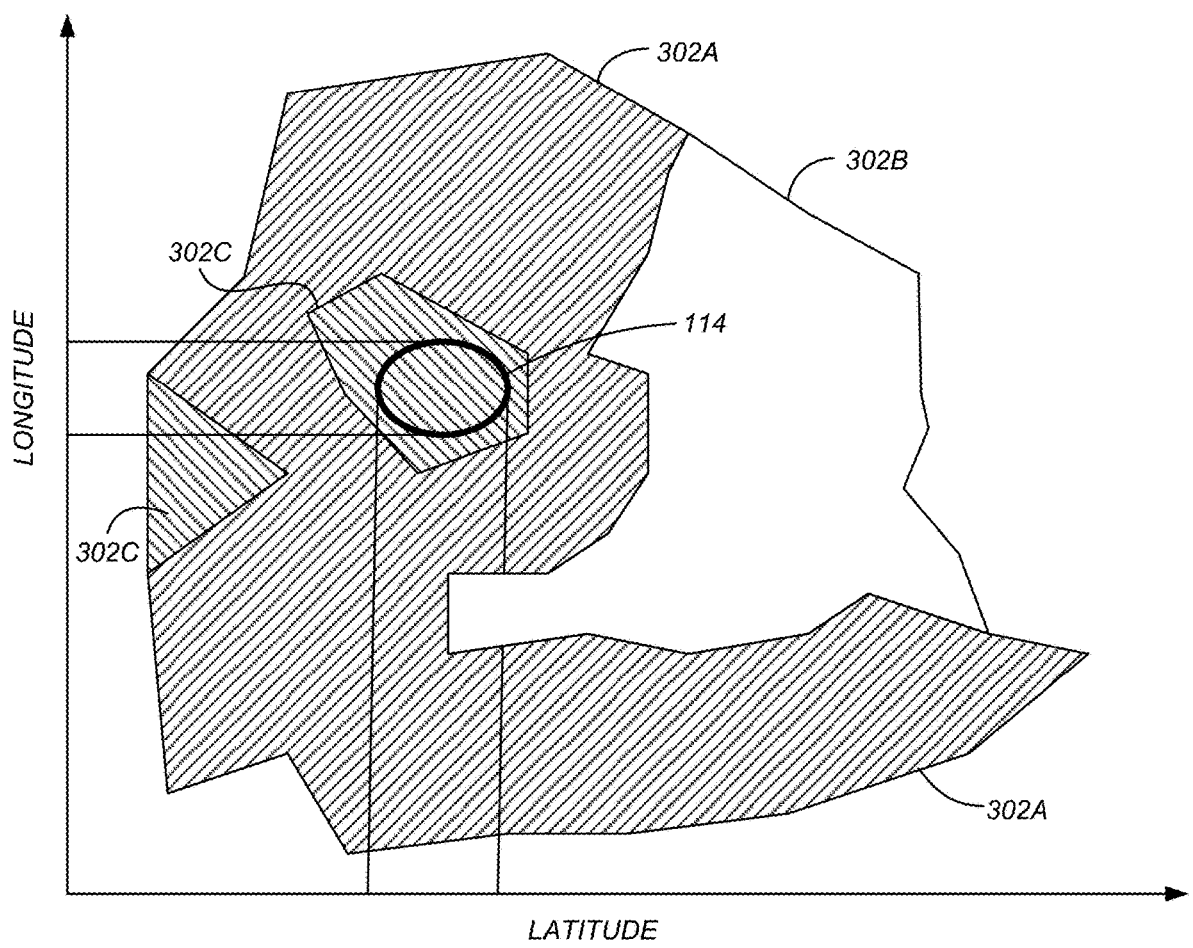
FIG. 3 is a diagram presenting an exemplary embodiment of geospatial portions and a region of interest within geospatial portion.

FIG. 3 is a diagram presenting an exemplary embodiment of geospatial portions 302A-302C (hereinafter alternatively referred to as geospatial portions(s) 302) and a region of interest 114 within geospatial portion 302C. As described above, the geospatial portions 302 comprise areas in physical GIS data sets, which may include geomorphic data sets (which describe soils and geology), LULC data sets, and BUA datasets. Typically, such data sets 202 describe large areas and are dated so that changes to the underlying data can be accounted for. These physical GIS datasets 202 can be used for regional geospatial analysis (e.g. population, carbon load estimation and urban planning).

Each of the foregoing geospatial portions 302 may comprise one or more materials within their boundaries. For purposes of the discussion below, geospatial portion 302A is an area of deciduous forest land, geospatial portion 302B is an area of cropland and pasture, while geospatial portion 302C is an area of mixed forest land. Further, geospatial portion 302A of deciduous forest land comprises deciduous trees, geospatial portion 302B of cropland and pasture comprises green grass and dry grass, and geospatial portion 302C of mixed forest land comprises a mix of coniferous and deciduous trees.

Figure 4:
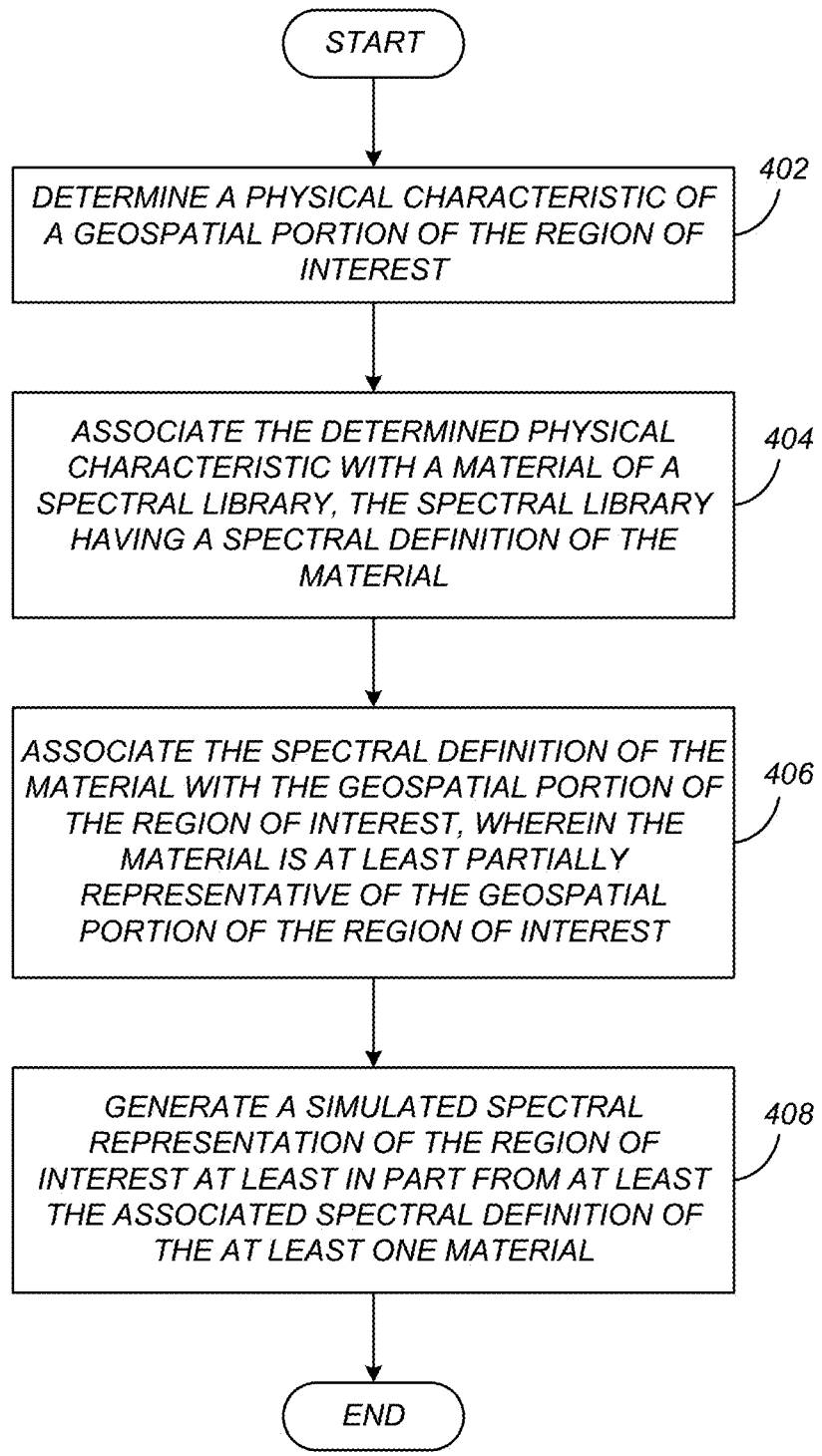
FIG. 4 is a diagram depicting exemplary operations that can be used to simulate the spectral information of geographic areas.

FIG. 4 is a diagram depicting exemplary operations that can be used to simulate the spectral information of geographic areas. In block 402, a physical characteristic of a geospatial portion 302 of a region of interest 114 is determined. For example, the region of interest 114 may be mapped to the geospatial portion 302C associated with the physical characteristic. For example, in the exemplary embodiment illustrated in FIG. 3, geospatial portion 302C may be determined (using GIS data) to comprise a physical characteristic that is comprised mixed forest land, as described above.

In block 404, the determined physical characteristic is associated with a material of a spectral library having a spectral definition of the material. In one embodiment, this can be accomplished by assigning each geospatial portion 302 with a value that describes the area (grasses, farmland, red sandy loam, etc.) For example, the mixed forest physical characteristic has been associated with geospatial portion 302C.

Figure 5:
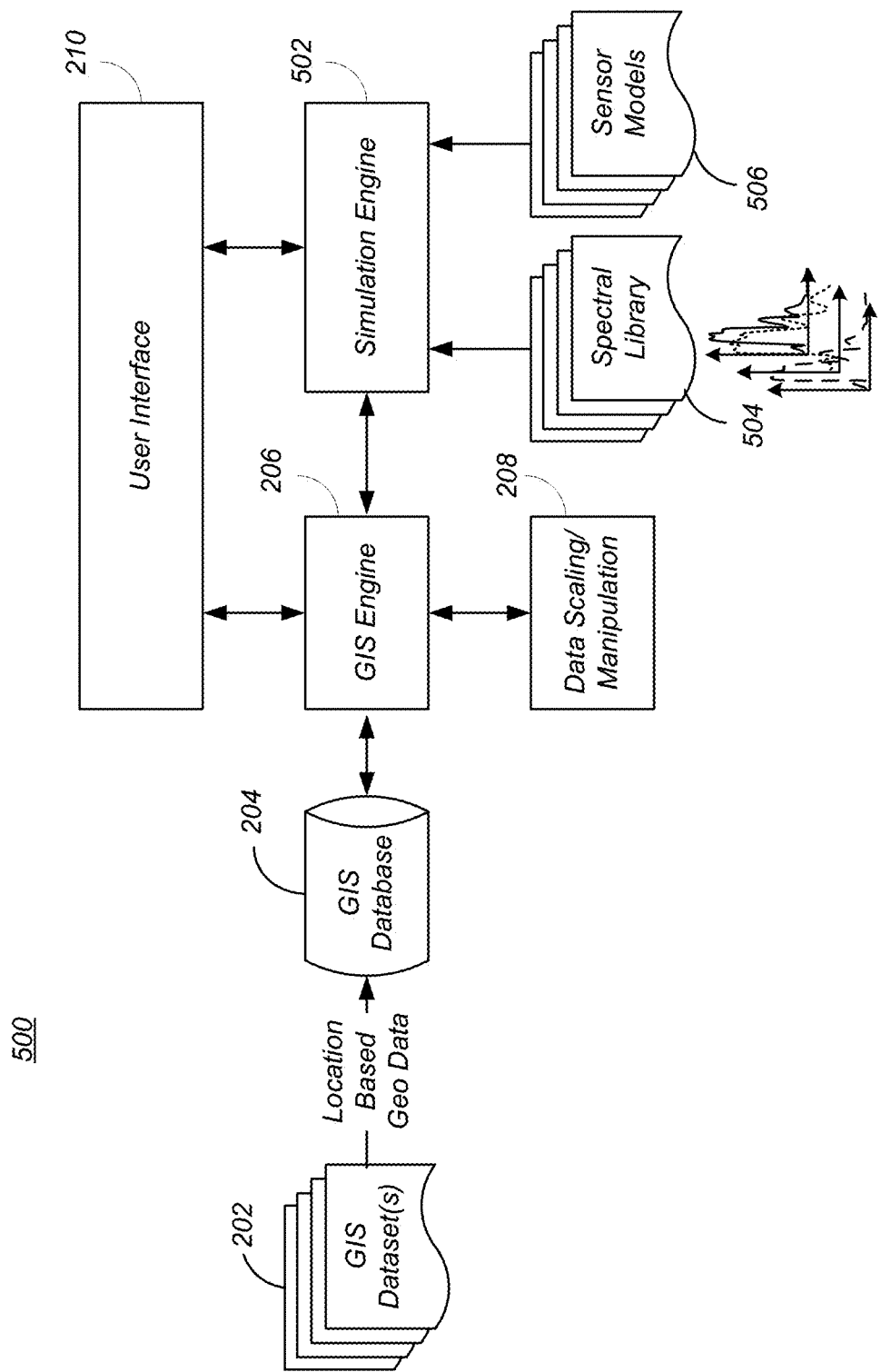
FIG. 5 is a diagram illustrating an exemplary embodiment of a spectral simulation system.

FIG. 5 is a diagram illustrating an exemplary embodiment of a spectral simulation system (SSC) 500 that can be used to perform the operations described in FIG. 4. The exemplary embodiment includes the features of the GIS system 200 shown in FIG. 2, and adds a simulation engine 502. In response to commands from the user interface 210, the simulation engine 502 accepts data from a spectral library 504 and sensor model library 506 and generates simulated spectra for the regions of interest 114 and resulting simulation data is presented to the user via the user interface 210. In the illustrated embodiment, the user interface 210 of the GIS system 200 is expanded to include the simulation functionality, however, a separate user interface 210 may be instead provided.

Figure 6A:
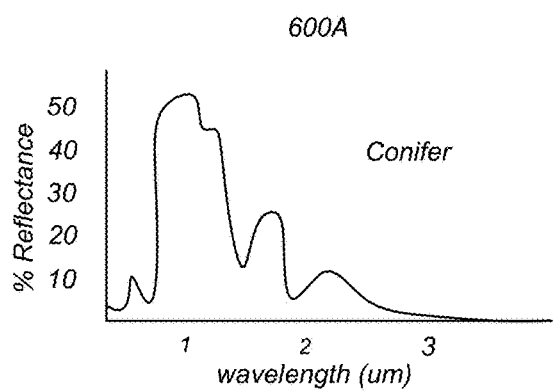
FIGS. 6A-6D are diagrams illustrating the spectral signatures of exemplary materials.
Figure 6B:
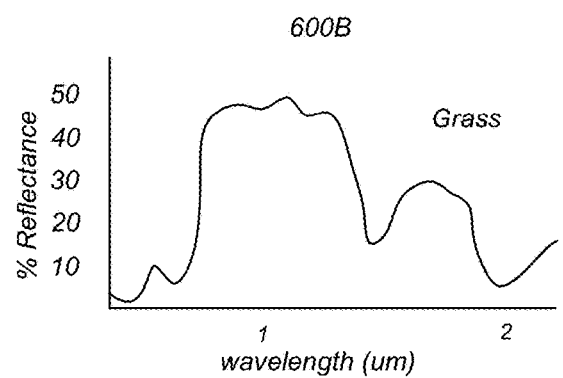
Figure 6C:
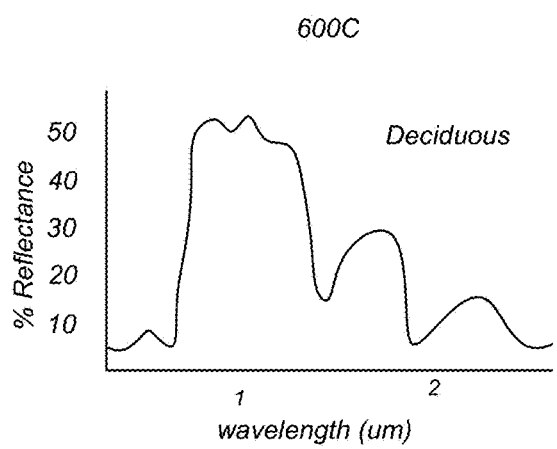
Figure 6D:
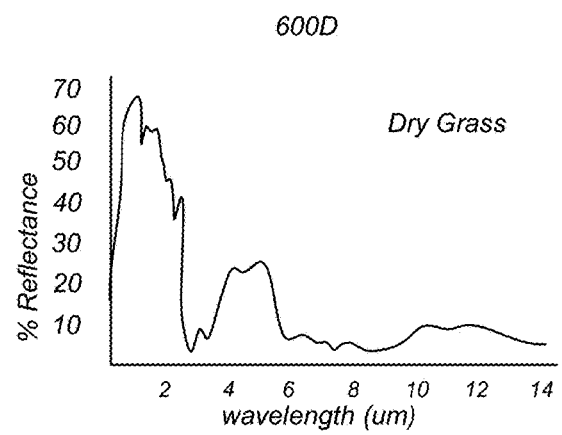

The spectral library 504 comprises information (typically, but not necessarily in tabular form) regarding the reflectance of the materials over one or more ranges of wavelengths. The information in the spectral library 504 defines the reflectance spectra (e.g. spectral signature) of the materials, and can be presented in graphical form. For example, FIGS. 6A-6D are diagrams illustrating the spectral signatures of exemplary materials (in terms of reflectance and wavelength) that may be found in geospatial portions 302. FIG. 6A illustrates an exemplary spectral signature of a conifer 600A and FIG. 6B illustrates an exemplary spectral signature of grass 600B. FIGS. 6A-6D illustrate exemplary spectral signatures for a conifer forest 600A, grass 600B, deciduous forest 600C and dry grass 600D.

In block 406, the spectral definition of the material is associated with the geospatial portion 302 of the region of interest 114. For example, the spectral signature or definition of the conifer forest 600A may be associated with geospatial portion 302C of mixed forest land. The conifer forest is at least partially representative of the geospatial portion 302C of mixed forest land. In one embodiment, this can be accomplished by assigning a spectral library name that is a best fit to each geospatial portion 302 (which may be represented by polygons) based on map names. Multiple library names are acceptable. This may be repeated for each GIS library (e.g. soils, LULC, manmade features). For example, Table I illustrates a relationship between map units and libraries:

TABLE I

| Map Unit | Libraries |
| --- | --- |
| JK14 | Ferrugnius_Sandstone_sandst4_2 |
| CC20 | Gray_silty_clay_coarse_86P4603, Brown_to_dark_brown_clay_coarse_88P475 |

Next, in block 408, a simulated spectral representation of the region of interest 114 is generated at least in part from the associated spectral definition of the at least one material. Hence, the spectral definition of the conifer forest 600A is used to simulate the spectral representation of the region of interest 114, because the region of interest 114 lies completely within the geospatial portion 302 of the mixed forest land, and there only one material (conifer forest) has been associated with geospatial region 302C.

FIGS. 7A-7C are diagrams depicting exemplary operations that can be used to simulate the spectral information of geographic areas in which a second material is present in the geospatial portion 302. In block 702 of FIG. 7A, the determined physical characteristic of the geospatial portion 302 of the region of interest 114 is associated with a second material of the spectral library 504, wherein the spectral library 504 also includes a spectral definition or signature of the second material. Referring again to FIG. 3, the geospatial characteristic (mixed forest) of geospatial region 302C is associated with a second material (deciduous forest).

In block 704 of FIG. 7B, the spectral definition of the second material (the deciduous forest in the example) is associated with the geospatial portion (302C, or mixed forest land in the foregoing example), wherein the second material is at least partially representative of the geospatial portion 302C of the region of interest 114. For example, the spectra of a deciduous forest 600C may be associated with geospatial portion 302C.

In block 706, a simulated spectral representation of the region of interest 114 is generated at least in part from the spectral definition of the first material and the spectral definition of the second material.

Figure 8:
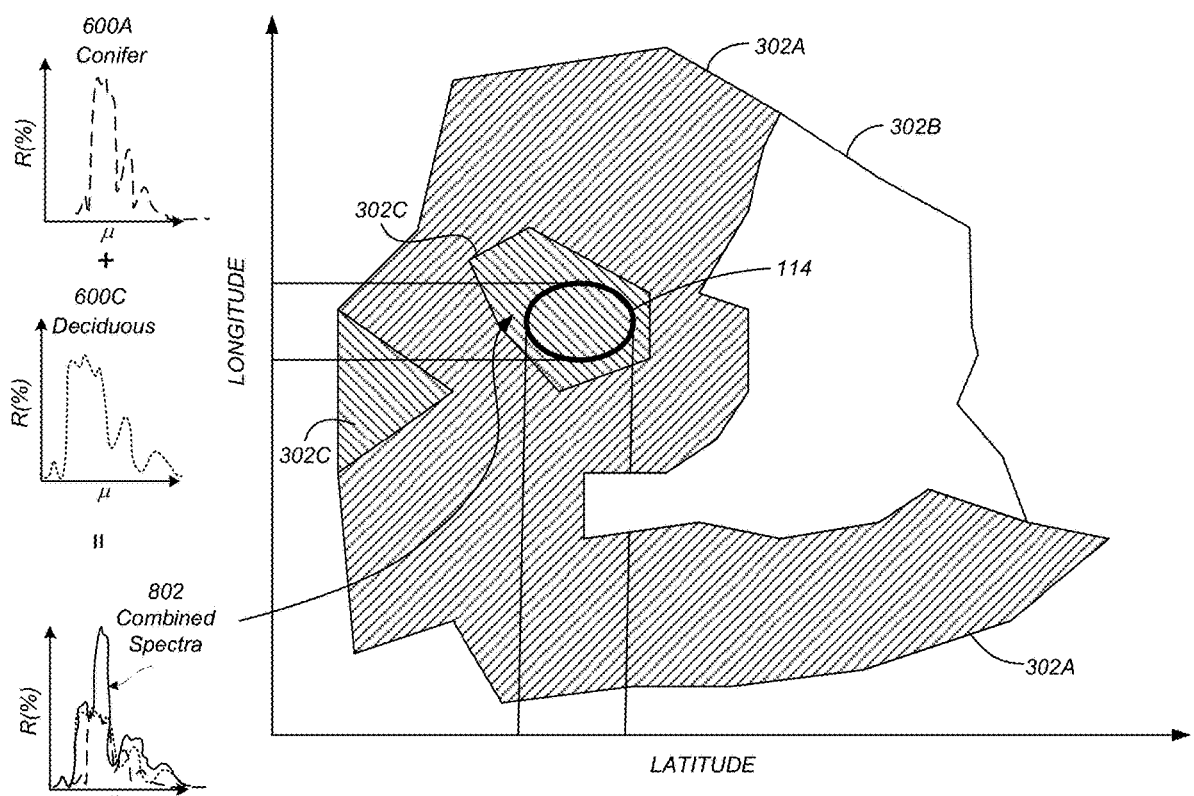
FIG. 8 is a diagram illustrating the generation of the simulated representation of the region of interest from the spectral definition of the first material and the spectral definition of the second material.

FIG. 8 is a diagram illustrating the generation of the simulated representation of the region of interest 114 from the spectral definition of the first material and the spectral definition of the second material. As illustrated, the simulated representation of the region of interest 114 is generated by combining the first material spectra 600A and the second material spectra 600C, and fusing the combined spectra 802 to the geospatial portion 302C.

In one embodiment the spectral definition of the materials contributing to the combined spectral definition in the geospatial portion 302C are weighted before their combination. This can be accomplished, for example, by weighting the spectral definition of one or more of the materials that together constitute the materials in the geospatial portion 302C. For example, the spectral definition of the first material may be weighted (e.g. scaled by multiplication) by a first weight or factor, and the second material may be weighted by a second weight or factor). Following such weighting, the simulated spectral representation of the region of interest 114 is generated at least in part from the weighted spectral definition of the first material and the weighted spectral definition of the second material. Accordingly, the reflectance values for each wavelength are based on the percentage that a tile, pixel, or geospatial portion 302 are made up of each material.

The selection of the foregoing weights or factors can be used to correlate predicted signatures of the regions of interest with actual measured signatures. For example, if the combined spectra 802 shown in FIG. 8 does not match actual spectral measurements taken with the sensor 104, the spectra can be weighted to scale the reflectance of one or more of the materials spectra up or down at any or all of the wavelengths $\mu$ of interest.

Figure 9A:
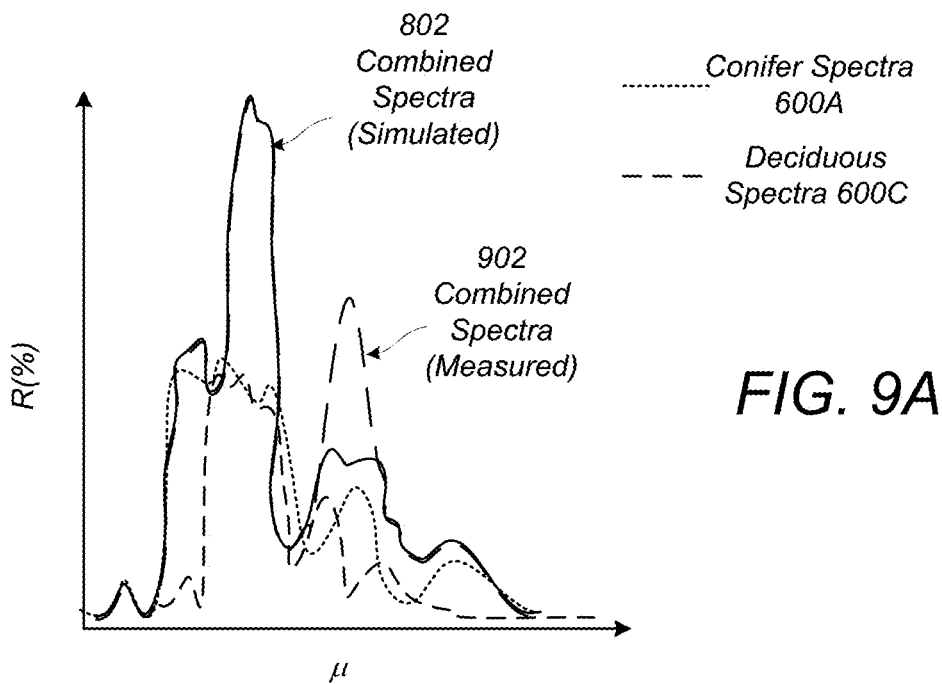
FIGS. 9A and 9B are diagrams illustrating the weighting of spectra to correlate simulated spectral results with measured results.
Figure 9B:
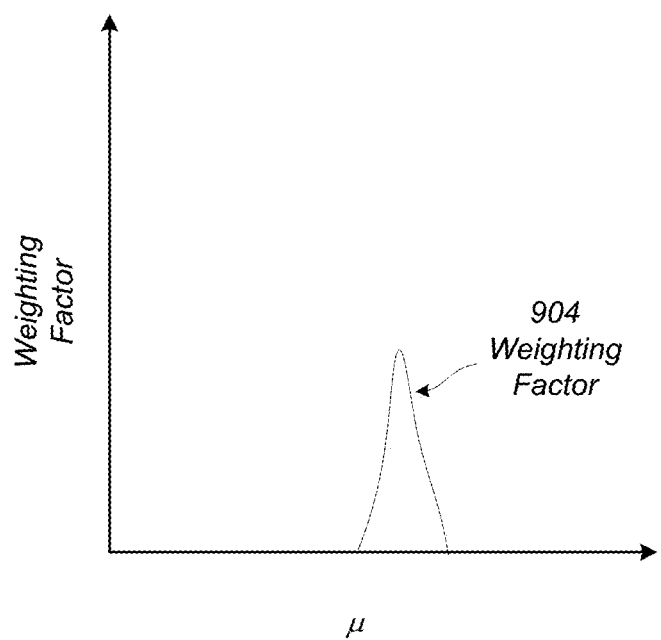

FIGS. 9A and 9B are diagrams illustrating the weighting of spectra to correlate simulated spectral results with measured results. FIG. 9A illustrates the combined simulated spectra 802 arrived at by combining the conifer spectra 600A and the deciduous spectra 600C. As shown, the simulated combined spectra 802 matches the measured combined spectra 902 at most wavelengths, but for some wavelengths, the combined measured spectra 902 shows greater reflectance than the simulated combined spectra 802. So that the simulated combined spectra 902 is better matched with the measured combined spectra 902, a weighting factor (which may vary as a function of wavelength) may be applied to any of the spectra contributing to the combined spectra, or to the combined spectra itself. In the illustrated embodiment, the frequency-varying weighting factor 904 is applied to the simulated combined spectra 802 to match the measured combined spectra 902. Of course, although illustrated as such, the weighting factor 904 need not be wavelength dependent.

Any particular portion of the region of interest 114 may comprise data from more than one GIS dataset 202. For example, although the foregoing example presented the use of geospatial portions 302 derived from LULC information (forests, grasses, and the like), the region of interest 114 may include data from other GIS datasets 202, for example, a BUA GIS dataset 202.

Figure 10:
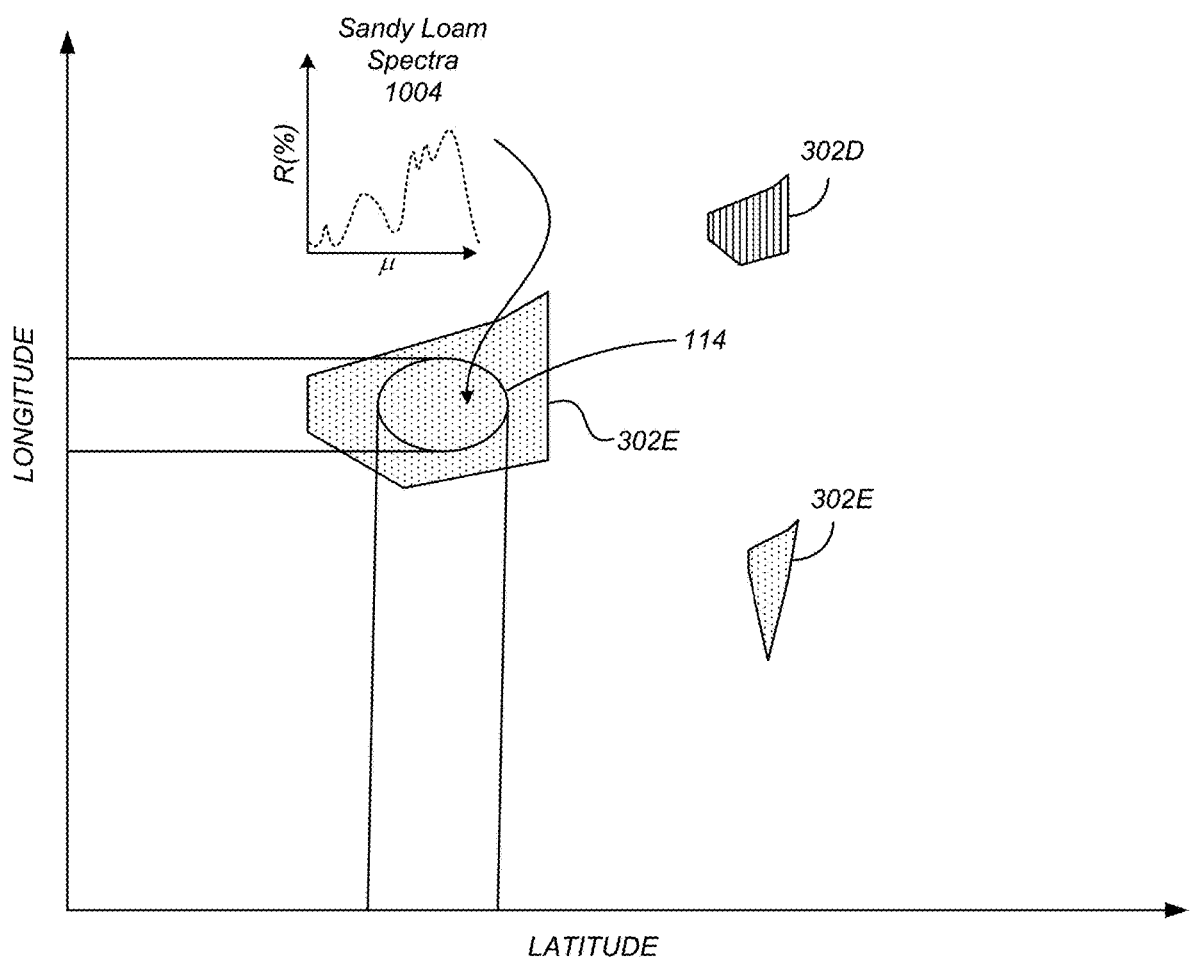
FIG. 10 is a diagram illustrating the geospatial portions of a second global information system dataset.

FIG. 10 is a diagram illustrating the geospatial portions 302D and 302E of a second GIS dataset 202. These geospatial portions 302D, 302E, may be associated with physical characteristics. For example, geospatial portion 302D may be associated with an asphalt parking lot, while geospatial portion 302E may be associated with a concrete parking lot.

Figure 11:
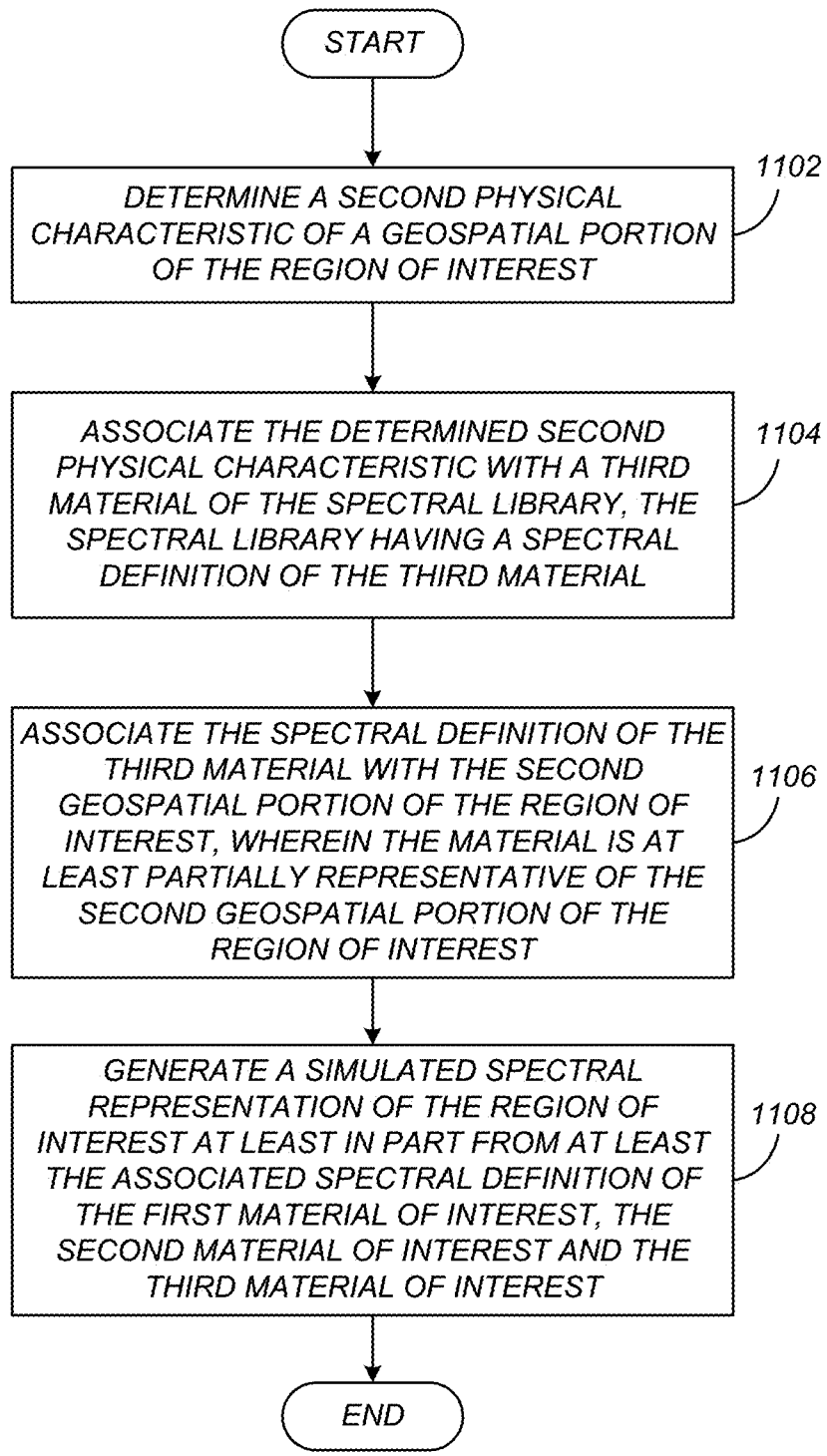
FIG. 11 is a diagram illustrating exemplary operations used to fuse spectral data from a second global information system dataset.

FIG. 11 is a diagram illustrating exemplary operations used to fuse spectral data from a second GIS dataset 202. In block 1102, a second physical characteristic of a second geospatial portion 1102A of the region of interest 114 is determined. For example, referring to FIG. 10, the physical characteristic associated with geospatial portions 302E and 302D may be that of soil. In block 1104, the determined second physical characteristic is associated with a material of the spectral library 504 that is at least partially representative of the second geospatial portion 302E of the region of interest 114. In the illustrative example of FIG. 10, this material may be a sandy loam type of soil. In block 1106, the spectral definition of the third material (sandy loam) is associated with the second geospatial portion 302E of the region of interest 114. Finally, as shown in block 1108, a simulated spectral representation of the region of interest 114 is generated from at least the associated spectral definitions of the first material of interest, the second material of interest, and the third material of interest (in the foregoing example, conifer 600A, deciduous 600C, and sandy loam 1004.

Typically, the fusing of the spectral definitions into the geospatial portions 302 comprises computing a sum or combination of the reflectance values of each of the materials present in the geospatial portion 302 on a pixel by pixel basis (with each pixel representing a particular geographic area in the region of interest. When computing the simulated spectral representation of the region of interest 114, the contributions from each pixel within the region of interest is then included.

Figure 12:
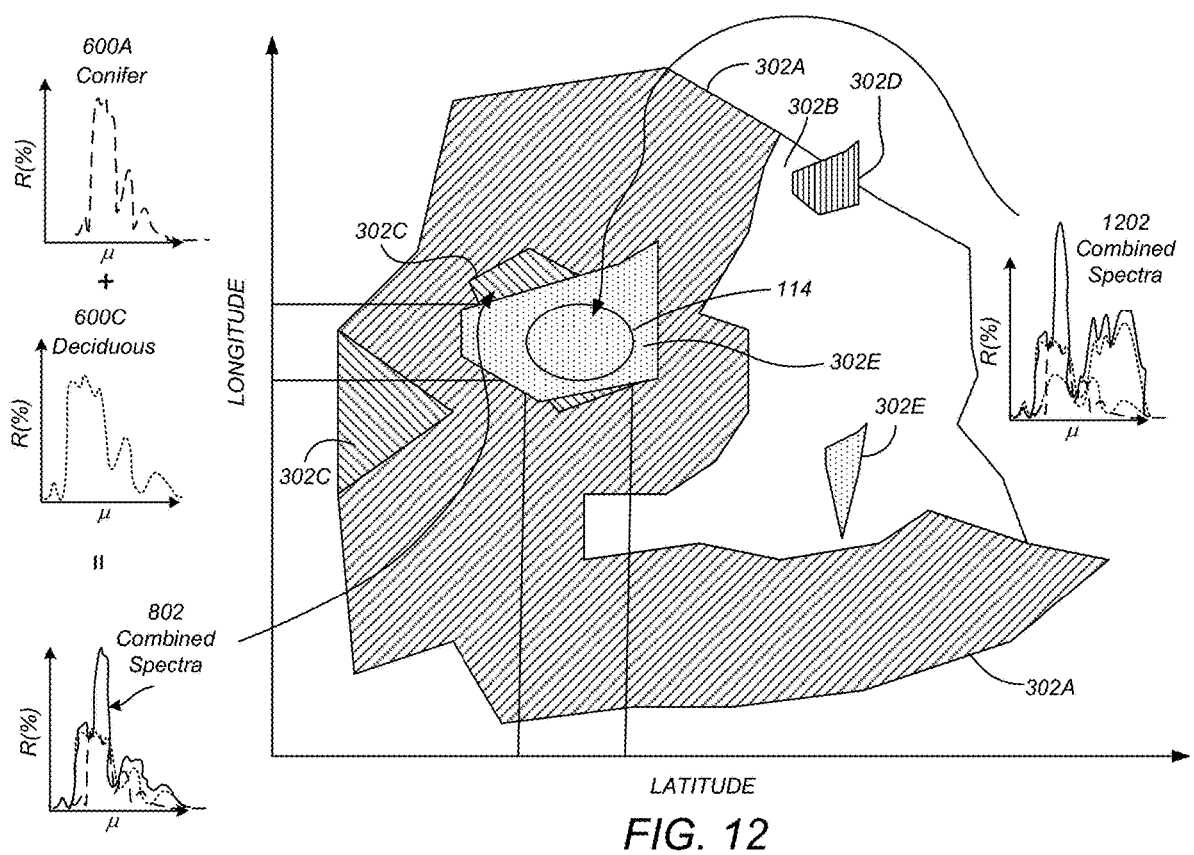
FIG. 12 is a diagram illustrating the generation of the simulated representation of a region of interest from the spectral definition of the first material and second material within geospatial portion.

FIG. 12 is a diagram illustrating the generation of the simulated representation (e.g. combined spectra 1202) of the region of interest 114 from the spectral definition of the first material and second material within geospatial portion 302C, as well as the spectral definition of the third material within geospatial portion 302E.

Just as the contribution to the each of the spectra of different materials in a geospatial portion may be individually weighted before they are combined, so may the contribution of the spectra from different GIS datasets 202. Further, such weighting can optionally be frequency dependent. For example, the combined deciduous and conifer spectra 802 may be weighted before being combined with the asphalt spectra 302D, or the asphalt spectra 302D may be weighted before such combination.

In the foregoing example, the region of interest 114 was completely bounded by the first geospatial portion 302C and the second geospatial portion 302E. Hence, every pixel representation in the region of interest 114 will include the spectra from the materials within the geospatial portions 302C, 302E in which the region of interest 114 is contained. However, the region of interest 114 may cross geospatial region boundaries, and may include portions of different geospatial regions from different GIS datasets 202. In this case, the region of interest is mapped to a plurality of geospatial portions 302, each of which are associated with a physical characteristic.

Figure 13:
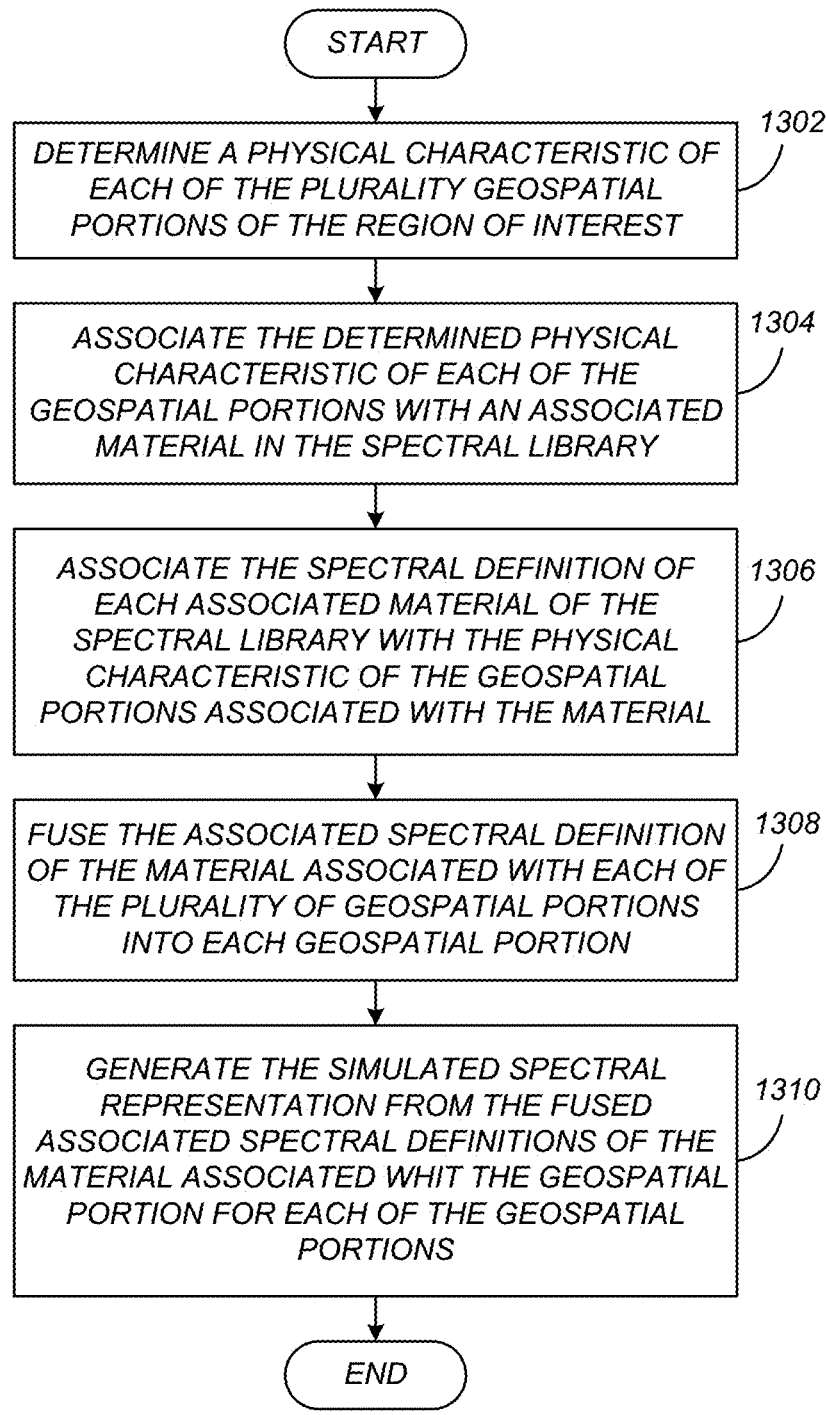
FIG. 13 is a diagram illustrating exemplary operations for generating a simulated spectral representation of a region of interest wherein the region of interest is mapped to a plurality of geospatial portions.

FIG. 13 is a diagram illustrating exemplary operations for generating a simulated spectral representation of a region of interest, wherein the region of interest is mapped to a plurality of geospatial portions 302, each associated with a physical characteristic. In block 1302, a physical characteristic is determined for each of the plurality of geospatial portions 302 at least partially within the region of interest 114.

Figure 14:
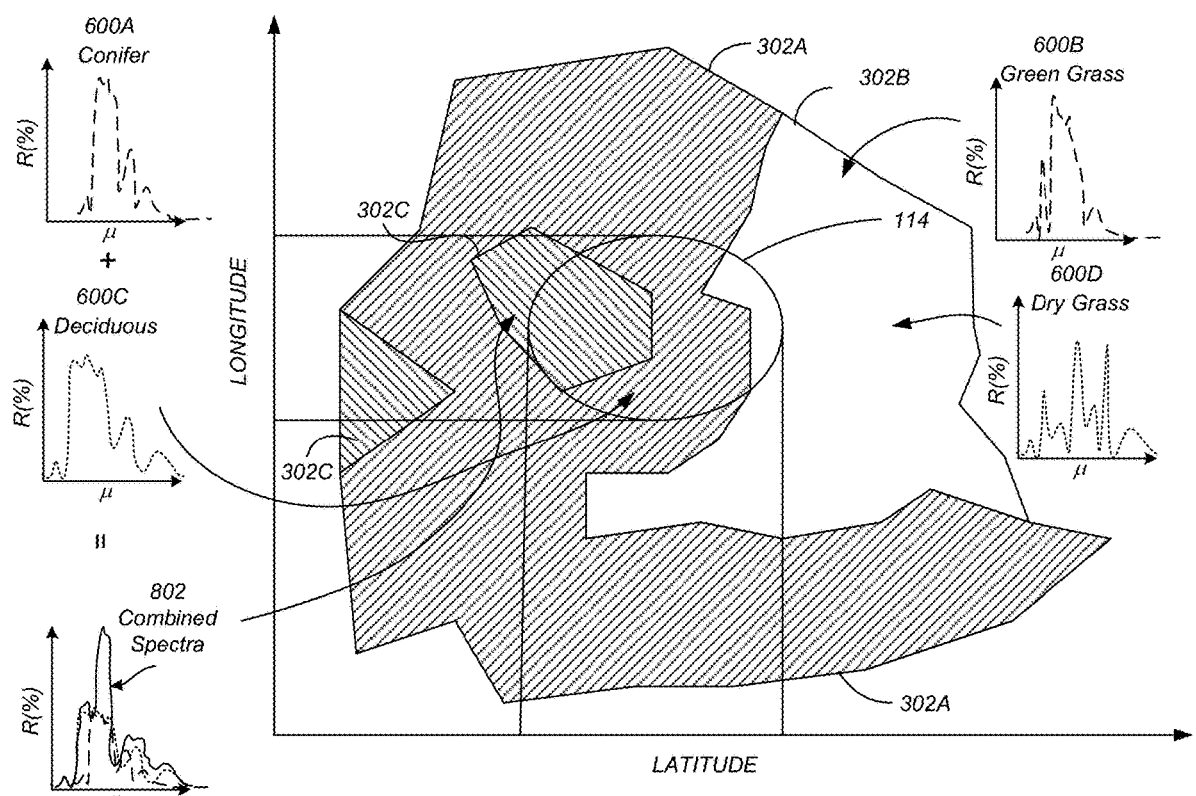
FIG. 14 is a diagram illustrating the generation of the simulated representation of a region of interest that includes multiple geospatial portions.

FIG. 14 is a diagram illustrating the generation of the simulated representation (e.g. combined spectra 1202) of the region of interest 114 that includes multiple geospatial portions 302A-302C. In the illustrated embodiment, each of the multiple geospatial portions 302A-302C are described in the same GIS data set. As illustrated at least a portion of geospatial portions 302A-302C are included within the region of interest, therefore, a physical characteristic is determined of the geospatial portions 302A-302C. In the illustrated embodiment, they include a first geospatial portion 302C associated with a mixed forest, a geospatial portion 302B associated with deciduous forest land and a geospatial portion 302A associated with cropland and pasture.

Referring again to FIG. 13, in block 1304, the determined physical characteristic of each of the geospatial portions included 302A-302C within the region of interest 114 is associated with a material in the spectral library 504. Referring to the example of FIG. 14, the conifer and deciduous material may be associated with the mixed forest geospatial region 302C, the deciduous material is associated with the deciduous forest geospatial region 302A, and the green grass and dry grass materials are associated with crops and pasture geospatial region 302B.

Returning to FIG. 13, block 1306 associates the spectral definition of each associated material of the spectral library with the physical characteristics of the geospatial portions 302 associated with the material. FIG. 14 illustrates the spectral definitions being associated with the geospatial portions 302. For example, the conifer 600A and deciduous spectra 600C are associated with the mixed forest geospatial portion, the deciduous spectra 600C is associated with the deciduous geospatial portion, and the green grass spectra 600B and dry grass spectra 600D are associated with the cropland and pasture geospatial portion 302B. Next, block 1308 fuses each of the associated spectral definitions of the material associated with each of the plurality of geospatial portions into each geospatial portion. As shown in FIG. 14, the combined conifer and deciduous spectra 802 is fused into mixed forest geospatial portion 302C, the combined green grass 600B and dry grass spectra 600D is fused into cropland and pasture geospatial portion 302B, and the deciduous spectra 600C is fused into the deciduous geospatial portion 302A. As described above, the any of the spectra 600 or combined spectra may be weighted, and the weighting of any of the spectra may differ in different geospatial portions 302.

The result of the foregoing operations is a simulated spectral representation of the region of interest 114. The portion of the region of interest 114 that falls within the crop and pasture geospatial portion 302B will take on the simulated spectral representation of the combined green grass spectra 600B and dry grass spectra 600D. Hence, pixels in an image or representation of this region of interest 114 is simulated with the associated combined green grass 600B and dry grass 600D spectra. That portion of the region of interest 114 that falls within the deciduous geospatial portion 302A is simulated with the associated deciduous spectra 600C, and the portion of the region of interest 114 that falls within the mixed forest geospatial portion 302C is simulated with the associated spectra 802.

Configuration of Sensors Using Simulated Spectra

As described above, the sensor(s) 104 used in the surveillance platform 102 may be one or more of many types (e.g. active, passive, or semi-active) and may operate in a wide variety of wavelengths, bandwidths, resolutions and/or sensing techniques. Sensors 104 discriminate target information from background information best when those sensor characteristics are chosen to match the expected characteristics of the region of interest 114. The above described technique of generating an accurate spectral simulation a region of interest 114 permits sensor(s) 104 characteristics to be more accurately and efficiently chosen than would otherwise be possible, thus permitting the capture of more accurate sensor 104 data with less guesswork.

Figure 15A:
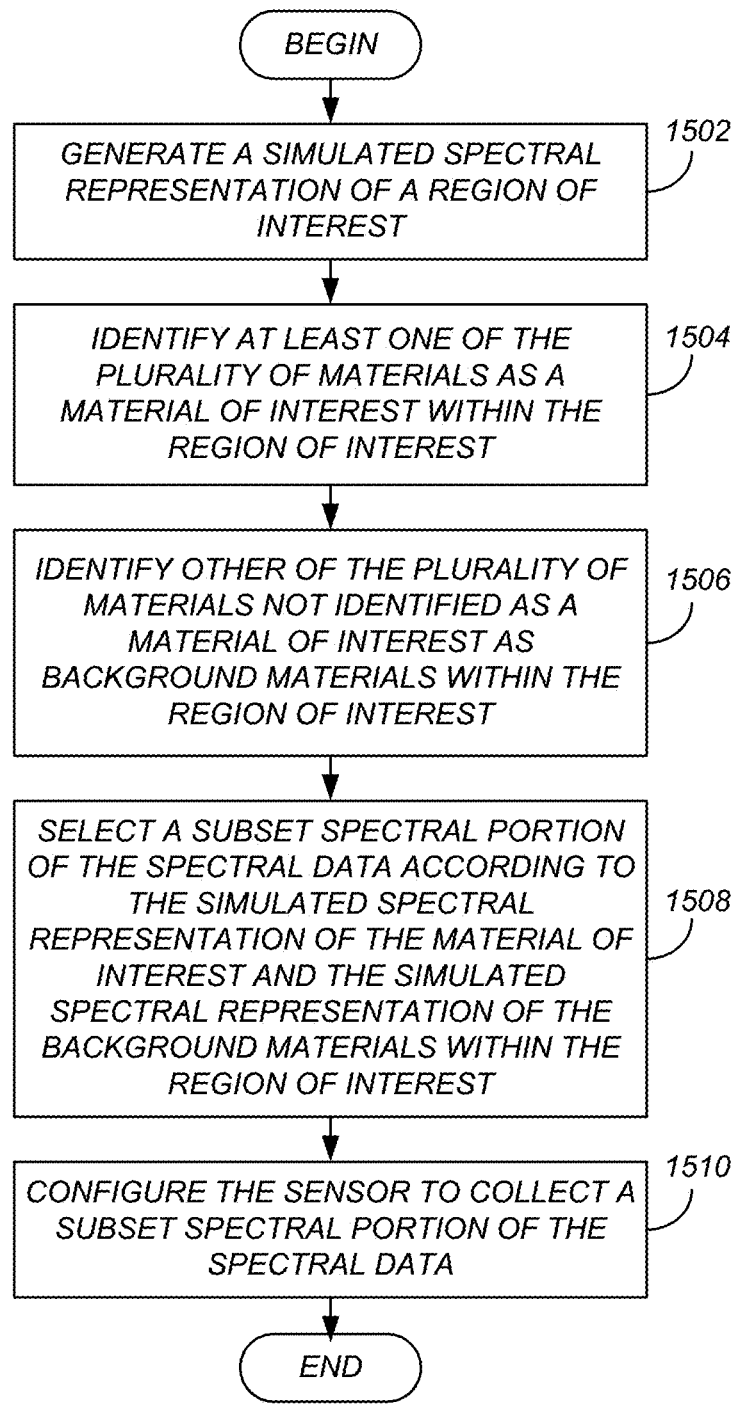
FIGS. 15A-15B are diagrams illustrating exemplary operations usable to configure one or more sensors on the surveillance platform to collect sensor data.

FIG. 15A is a diagram illustrating exemplary operations usable to configure one or more sensors 104 on the surveillance platform 102 to collect sensor data. In block 1502, a simulated spectral representation of the region of interest 114 is generated. As described above, the simulated spectral representation comprises a plurality of geospatial portions 302 at least partially disposed in the region of interest 114, each geospatial portion 302 having spectral characteristics of a plurality of materials disposed in the respective geospatial portion 302. In block 1504, at least one of the plurality of materials within the region of interest 114 is identified as a material of interest. More than one material within the region of interest 114 may be identified as a material of interest. For example, the user may be interested in making measurements of a field that has wheat planted on soil comprising sandy loam. In that case, there are two "materials of interest" . . . sandy loam and wheat, whose combination of spectral signatures may be weighted as described as above to form a composite signature.

Other materials of the plurality of materials in the region of interest 114 are identified as background materials, as shown in block 1506. In one embodiment, the background materials include all other materials not identified as one of the materials of interest. In other embodiments, the background materials may not include every material in the region of interest 114 that has not been identified as a material of interest. This may occur, for example, if a particular material has a spectral signature clearly outside of the range of the sensor(s) 104 that are being considered to be used to collect sensor data. For example, a material in the region of interest 114 may emit energy only in the x-ray spectrum, and if the desired sensor 104 does not sense information in the x-ray spectrum, that material need not be included among the background materials.

In block 1508, a subset spectral portion of the spectral data is selected. This selection is made according to the simulated spectral representation of the material of interest and the simulated spectral representation of the background materials of the region of interest.

Figure 15B:
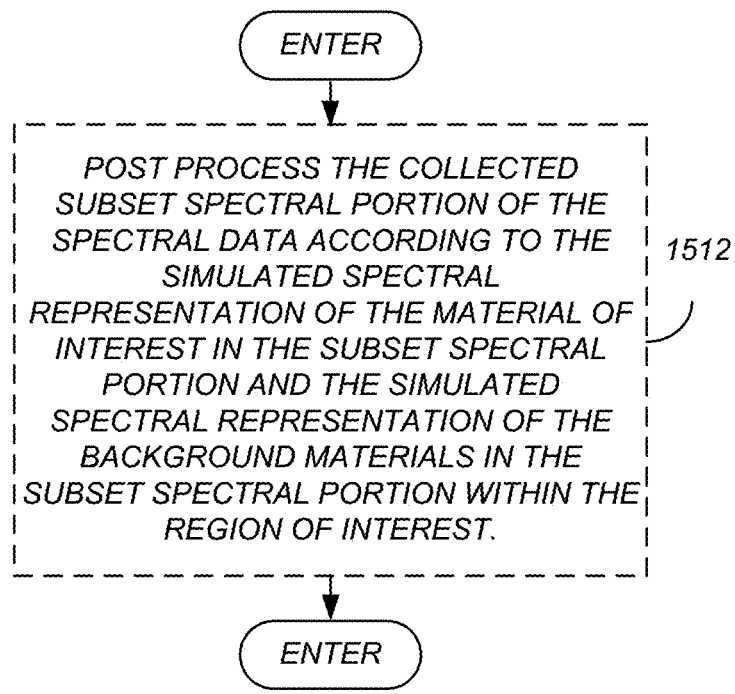

FIG. 15B is a diagram illustrating optional post-processing. In block 1512, the collected subset spectral portion of the spectral data is post processed according to the simulated spectral representation of the material of interest in the subset spectral portion and the simulated spectral representation of the background materials in the subset spectral portion within the region of interest. Such post-processing may include spectral feature fitting, spectral angle mapping, linear spectral unmixing and matched filtering.

Figure 16:
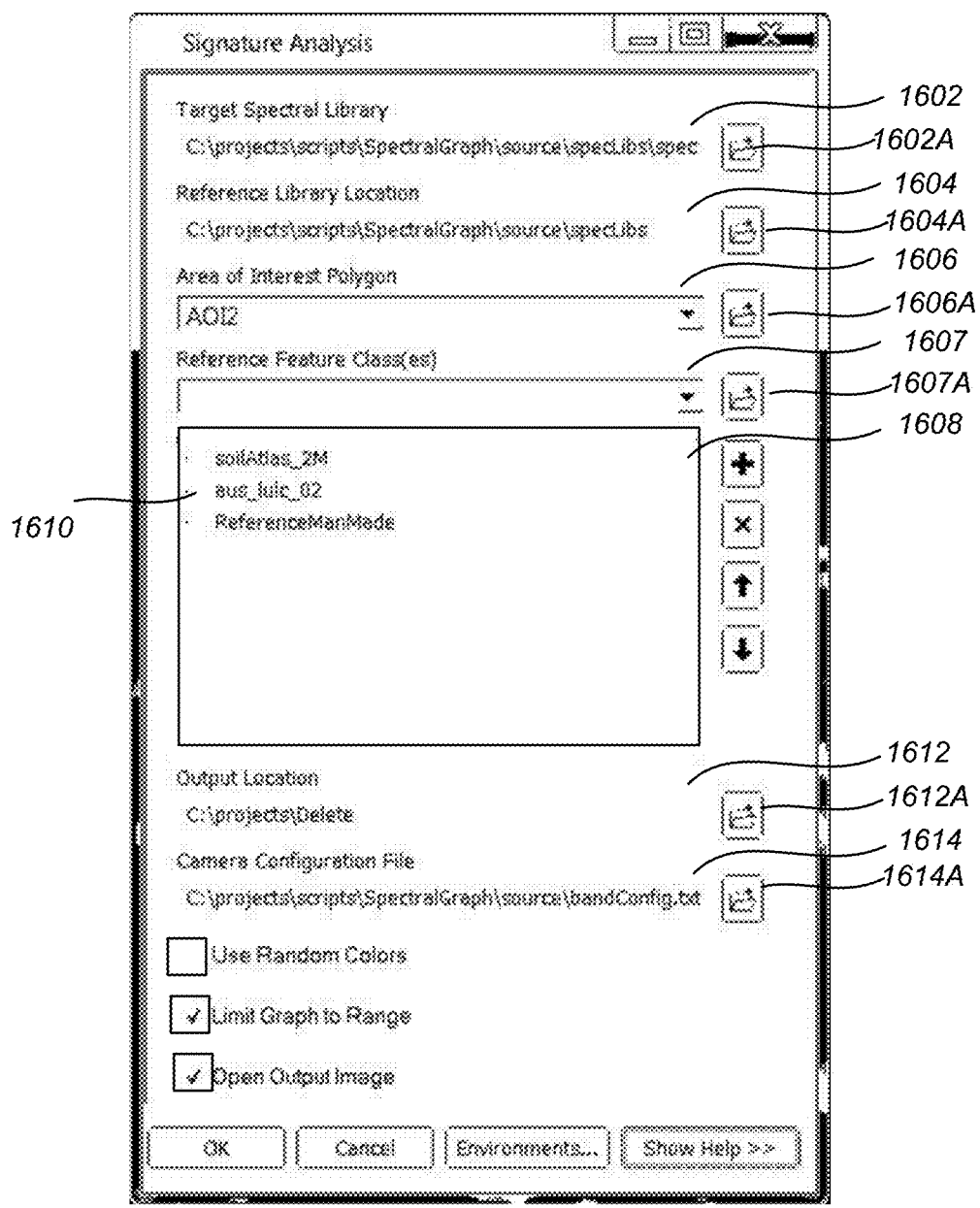
FIG. 16 is a diagram depicting one embodiment of a user interface that can be used to select the spectral portion of the spectral data.

FIG. 16 is a diagram depicting one embodiment of a user interface 1600 that can be used to select the spectral portion of the spectral data. In this embodiment, a spectral for the material of interest (desired target material) is selected from the spectral library 504 via target spectra control 1602, and the location of the spectral library 504 is selected via spectral library location control 1604. The region of interest (in the user interface 1600, this is termed the "area of interest" or AOI) can be user defined as a polygon or other general shape, and is selected via region of interest control 1606. The region of interest 114 can be user selected to be a particular static area to be surveyed by the sensor 104, or a flight path of a sensor field of view (FOV) of the surveillance platform 102 over time. Since the region of interest 114 includes a temporal component in this embodiment, simulation results likewise are temporally varying in nature (e.g. the simulated spectra change over time, as the geographic area to be simulated changes). Reference feature control 1607 allows the user to find GIS datasets 202 to include in the simulation, with GIS datasets 202 selected for inclusion in the simulation indicated in window 1610. GIS datasets 202 may be prioritized and weighted using the controls right of the window 1610. Control 1612 allows the user to select where the resulting simulation results will be stored, and the sensor configuration window 1614 allows the user to select a particular sensor configuration. Controls 1602A-1614A allow the user to navigate within subdirectories for the associated controls 1602-1614, respectively.

Figure 17:
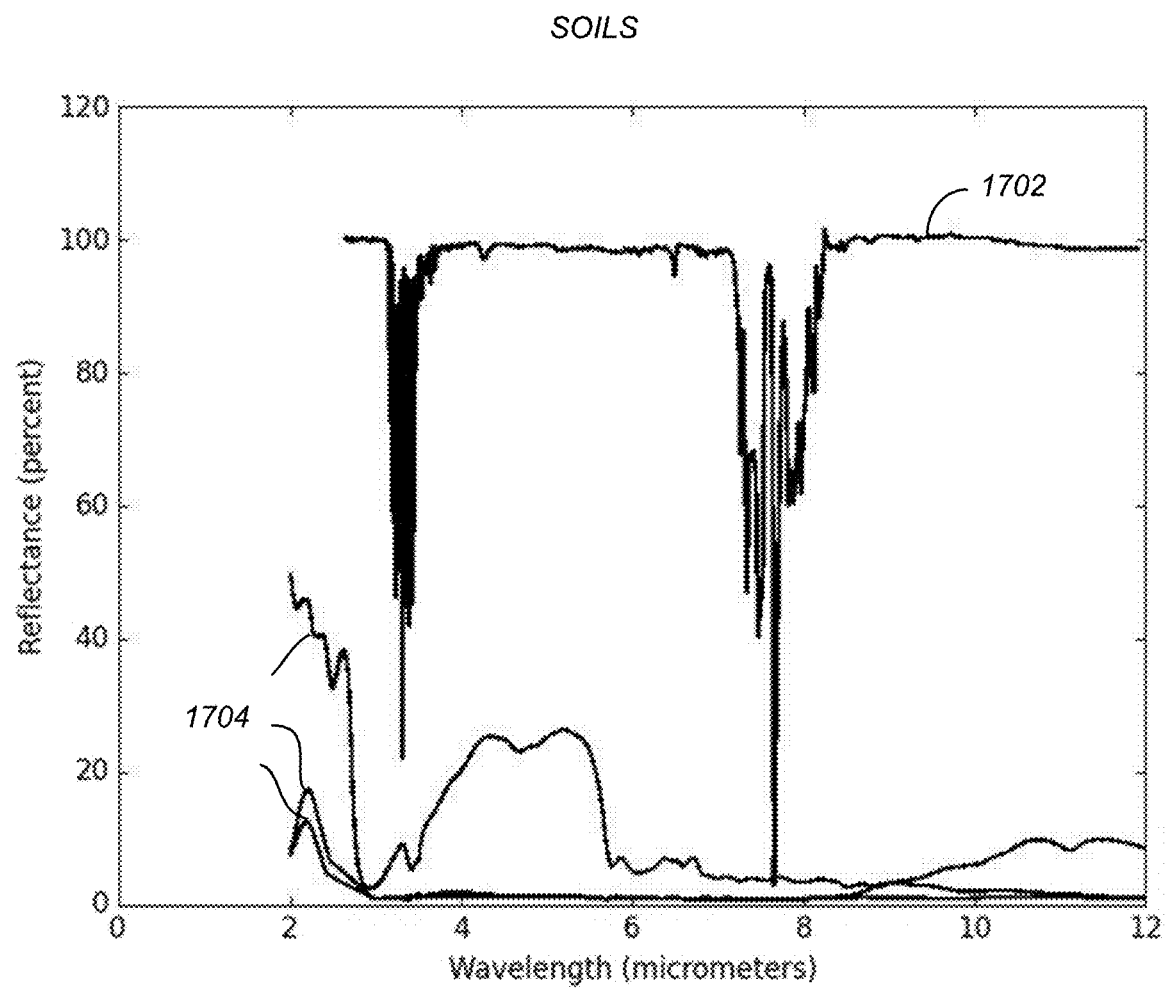
FIGS. 17-19 are diagrams showing plots of simulated spectral representations for a region of interest using a single band in the infrared wavelengths.
Figure 18:
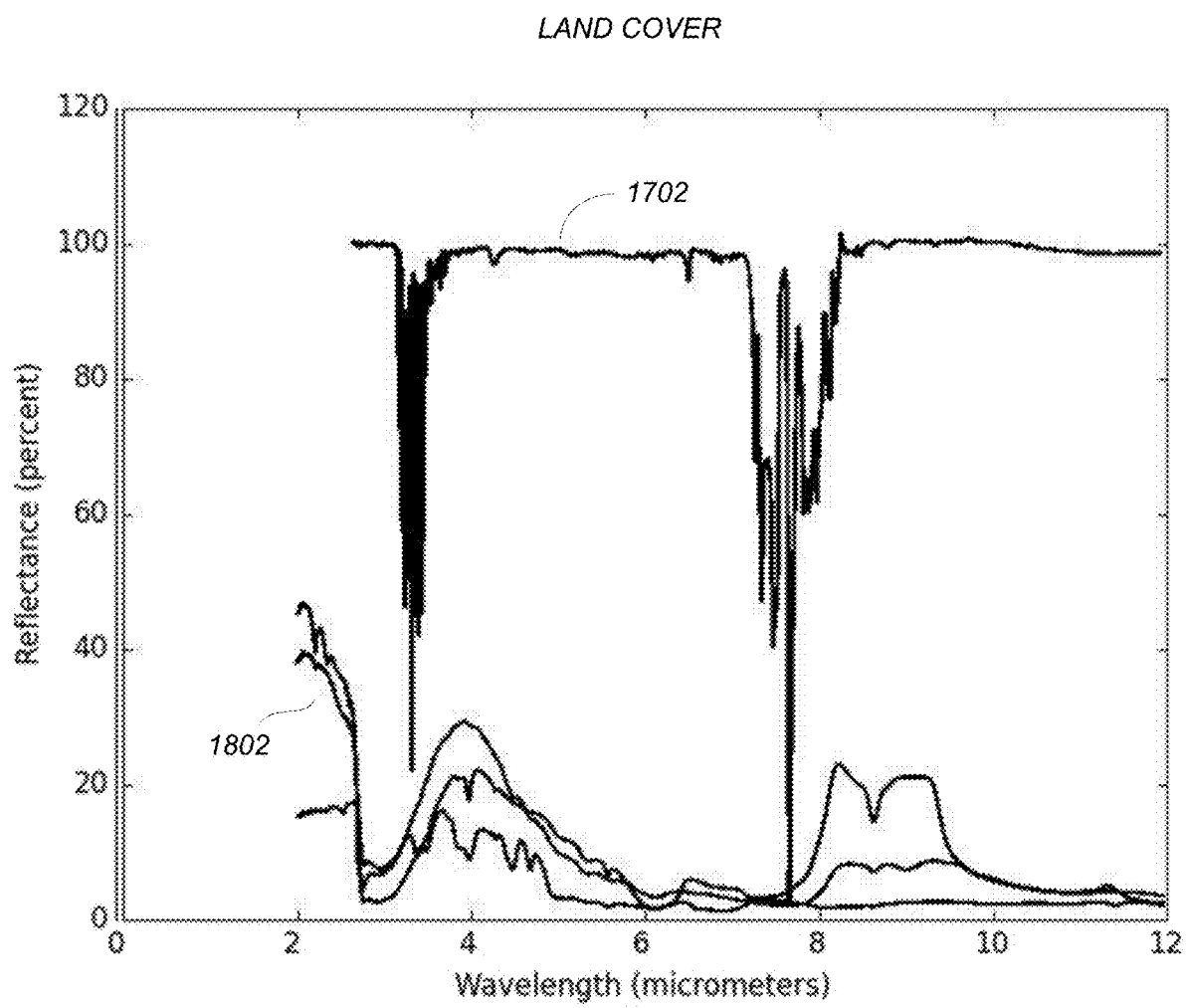
Figure 19:
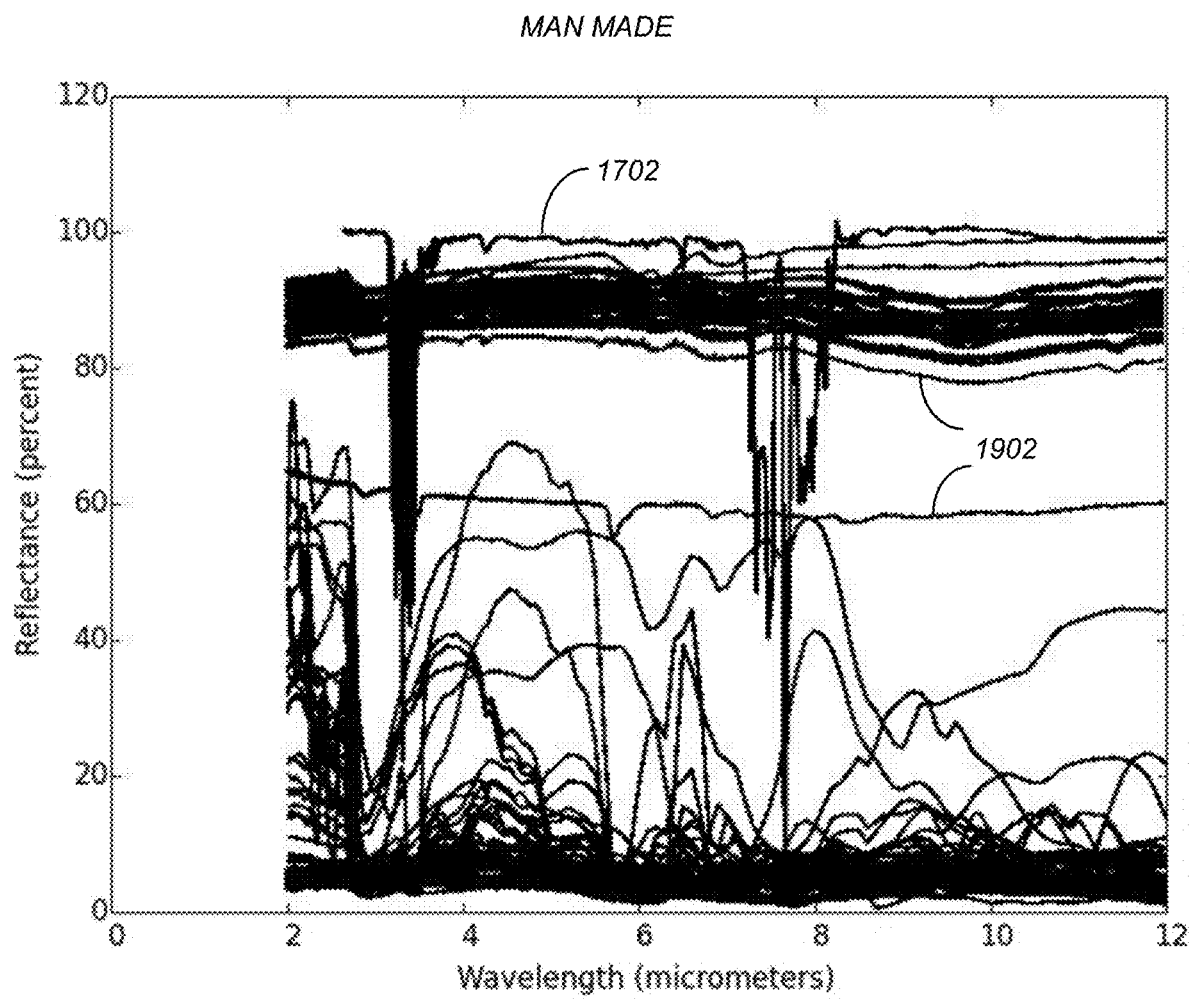

FIGS. 17-19 are diagrams showing a plots of simulated spectral representations for a region of interest 114, using a single band in the infrared (IR/thermal) wavelengths, thus mimicking a forward looking infrared (FLIR) configuration. In this case the sensor configuration may be described as shown in Table II:

TABLE II

| Sensor Configuration | | |
| --- | --- | --- |
| Name | Test_Sensor_02 | |
| Bands | 1 | |
| Band | Wavelength (μm) | Bandwidth (nm) |
| B01 | 7.0 | 10.0 |

FIG. 17 is a diagram showing a plot of a simulated spectral representation of the material of interest 1702 (in the illustrated example, methane) and background soil materials 1704. Note that against the soils background material, the material of interest can be easily distinguished at any wavelength between 4-7 and 9-12 micrometers, but that the material of interest is more difficult to distinguish at about 3.5 and 7.5 micrometers. Hence, for this case, the selection of the subset spectral portion described in block 1508 of FIG. 15A comprises selecting a frequency band (e.g. 9-12 micrometers), as the amplitude of the simulated spectral representation of the material of interest is greater than the amplitude of the simulated spectral representation of the background materials in the 9-12 frequency band. Other subset portions may be selected as well, for example, the 4-7 micrometer portion.

FIG. 18 is a diagram showing the plot of the simulated spectral representation of the material of interest 1702 and a background of land cover 1802. Note again that the material of interest is more easily distinguishable at wavelengths between 4-7 and 9-12 micrometers.

FIG. 19 is a diagram showing a plot of the simulated spectral representation of the material of interest 1702 against man made background materials 1902. Note that the man-made background materials present greater difficulties in configuring the sensor 104 to discriminate the target material of interest from the background materials 1902. For example, the reflectance of the background materials is within 10% of the reflectance of the target material 1702 in the 4-7 and 9-12 micrometer wavelengths. While this may offer sufficient discrimination, the results shown in FIG. 19 may be used to further distinguish the target material from the background materials. For example, while the plots of background materials in the 80-90% reflectance range are close to the reflectance of the target material 1702 at most frequencies, they are substantially greater than the reflectance of the target material 1702 in the region of 3.5 micrometers and 7.5 micrometers. This characteristic can be used to distinguish the target material from the background materials. That is, while the plots shown in FIGS. 17 and 18 would appear to suggest that the sensor be configured to avoid the spectral regions of 3.5 and 7.5 micrometers, FIG. 19 suggests that these regions offer another discriminant because the reflectance of the target material is less than the reflectance of the background materials.

The foregoing results can be used to configure the sensor 104. For example, if the background materials were as shown in FIGS. 17 and 18, the sensor 104 would be configured to collect information, for example, in the 9-12 micrometer region. But when the sensor 104 is configured to collect information from an region or interest (or portion of a region of interest) with man made materials, the sensor would be configured to also collect information from in the 7.5 micrometer region and to use the fact that the expected reflectance of the target material is less at those wavelengths as a discriminant to distinguish from the man made materials background. Further note that while the 3.5 micrometer region might also be used, the simulation result 1702 for the target material of interest suggests that the 7.5 micrometer region is a better choice, as there are more distinguishable and persistent dips in the reflectance in the 7.5 micrometer range.

In block 1510, the sensor 104 is configured to collect the subset spectral portion of the spectral data. In one embodiment, the sensors 104 are configured according to pre-set sensor configuration. In another embodiment, the sensor 104 configuration may also be customized, for example, by creating a file having the parameters listed in Table II above, but with customized values. Further, sensors 104 may also be defined according to other parameters, such as dynamic range, resolution, pixel size, noise, and a number of other factors. For example, a multi-band sensor for distinguishing the material of interest from the background materials may be represented by the text file shown in Table III below

TABLE III

| Sensor Configuration | | |
| --- | --- | --- |
| Name | Test_Sensor_02 | |
| Bands | 2 | |
| Band | Wavelength (μm) | Bandwidth (nm) |
| B01 | 7.5 | 1.0 |
| B02 | 10.0 | 2.0 |

In block 1512, the collected subset spectral portion of the spectra data is optionally post-processed according to the simulated representation of the material of interest in the subset spectral portion of the simulated spectral representation of the background materials in the subset spectral portion within the region of interest 114. For example, in the foregoing example, the target material of interest may be identified by post processing the processing the collected data in bands B01 and B02 and identifying the areas which have a threshold reflectance at B02 but not B01 as being the target material of interest.

Post processing may comprise other processing techniques as well. For example, sensor data may be collected over wider wavelengths, and bandwidth filtered using post processing to remove data from spectral bands that are not of interest or useful in discriminating target spectra from background spectra. Similarly, noise filtering, match filtering, or other smoothing techniques may be employed.

The foregoing techniques also permit the updating of the spectral libraries 504, the sensor models 506 or both using the data collected by the sensor(s) 104. For example, in cases where the simulated target spectra differs from that of the measured target spectra, the differences can be used to update the target spectra of spectral library 504. Differences in viewing geometry, lighting, and other factors may be taken into account in this process. Similarly, the spectral libraries 504 may be updated to reflect differences between the simulated and measured spectra of the background materials. These updated spectral libraries can be used to generate future simulated spectral representations.

On-Platform Sensing Using Hyperspectral Imagers

As described above, hyperspectral imagers are sensors or sensor suites that collect and process data from across the electromagnetic wave spectrum by measuring reflected radiation at a series of narrow and typically contiguous wavelength bands. Such sensors ameliorate some of the planning and configuration problems inherent with other sensors 104, but severely stress processing requirements on the mobile surveillance platform 102 and base station 112. In the embodiment described below, the simulated spectral representation of the region of interest 114 is used to perform on-platform sensing and processing using hyperspectral imagers. In one embodiment, this on-board processing permits the surveillance platform 102 to send down only data of interest, thus ameliorating transmission bandwidth and latency concerns on communication link 116.

Figure 20A:
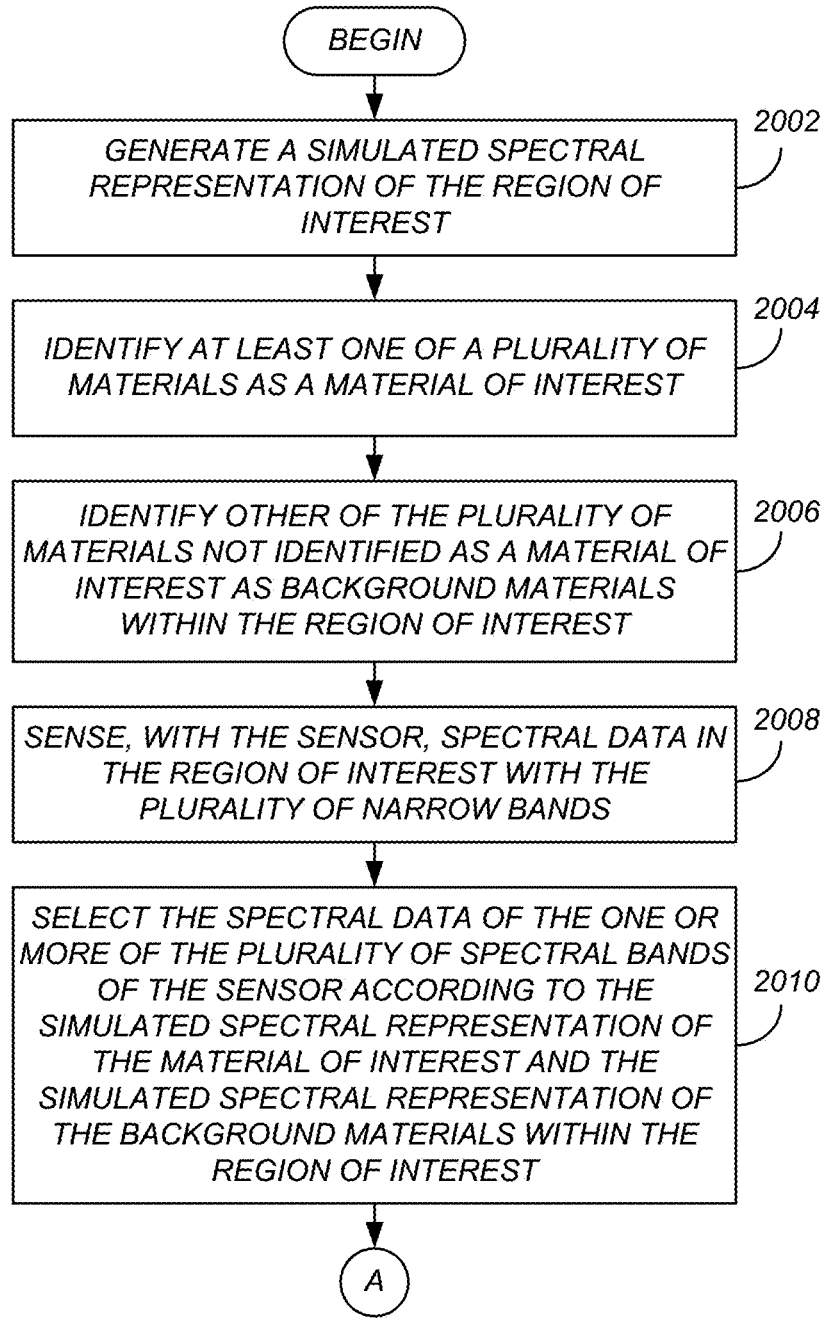
FIGS. 20A and 20B are diagrams illustrating exemplary operations that can be used to survey a region of interest using a hyperspectral sensor having a plurality of narrow spectral bands spanning a contiguous or near contiguous frequency space.
Figure 20B:
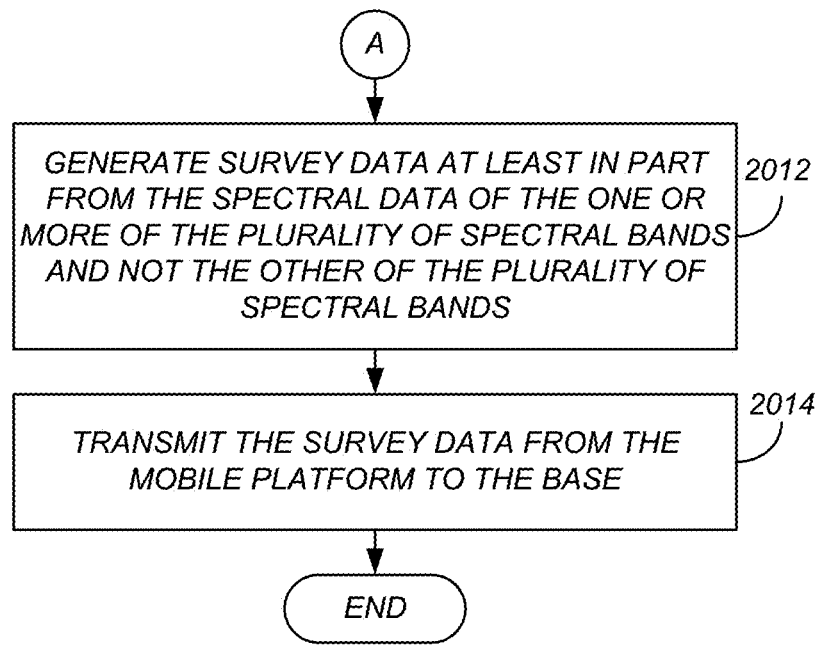

FIGS. 20A and 20B is a diagram illustrating exemplary operations that can be used to survey a region of interest 114 using a hyperspectral sensor having a plurality of narrow spectral bands spanning a contiguous or near contiguous frequency space.

Turning first to FIG. 20A, in block 2002, a simulated spectral representation of the region of interest is generated. The simulated representation of the region of interest 114 comprises a plurality of geospatial portions 302 at least partially disposed in the region of interest 114, each geospatial portion 302 having fused spectral characteristics of a plurality of materials disposed in the respective geospatial portion 302. In block 2004, at least one of a plurality of materials disposed within each geospatial portion 302 of the region of interest is identified as a material of interest. As described above, the material of interest may comprise one or more materials from the spectral library 504. In block 2006, other of the plurality of materials within the region of interest are identified as background materials. Also as described above, the background materials may include all of the other materials within the region of interest that are not a material of interest, or may include only a subset of such other materials.

In block 2008, the sensor 104 is used to sense spectral data in the region of interest within the plurality of narrow bands. Optionally, the spectral data may be sensed in only a subset of the plurality of narrow bands, using the sensor configuration techniques described above. Or, all of the plurality of narrow bands may be used to collect the spectral data.

In block 2010, the spectral data of one or more of the plurality of spectral bands is selected according to the simulated spectral representation of the material of interest and the simulated spectral representation of the background materials within the region of interest. For example, suppose the exemplary simulated spectral representation illustrated in FIG. 19 is generated with a hyperspectral imager that combines data collected in contiguous narrow spectral bands of 7.138 THz as shown in Table IV below:

TABLE IV

Hyperspectral Sensor Configuration
Sensor Configuration

| Name | Test_Sensor_01 |
|---|---|
| Bands | 12 |

| Band | Wavelength (μm) | Bandwidth (THz) |
|---|---|---|
| B01 | 2.05 | 7.138 |
| B02 | 2.15 | 7.138 |
| B03 | 2.25 | 7.138 |
| ... | ... | ... |
| B0X | 7.5 | 7.138 |
| ... | ... | ... |
| B0Y | 9.05 | 7.138 |
| ... | ... | ... |
| B0N | 11.95 | 7.138 |

In this case, the spectral bands of BOX and BOY may be selected for the reasons described above because the material of interest has greater reflectance than the background materials at the BOY wavelength of 9.05 micrometers (albeit by a small amount) and significantly less reflectance at the BOX wavelength of 11.95 micrometers.

Turning to FIG. 20B, survey data is generated at least in part from the spectral data of the one or more plurality of selected spectral bands and not the other of the plurality of spectral bands, as shown in block 2012. Referring again to the example of FIG. 19, the survey data may be generated from the spectral data collected in bands BOX and BOY.

In block 2014, the survey data is transmitted from the mobile platform 102 to the base station 112, which may be a ground station. Since the survey data now comprises only the spectral data collected in bands BOX and BOY, the amount of data to be transmitted is significantly less than would be the case if information from all bands were submitted.

In one embodiment, the mobile platform 102 performs other operations to generate the survey data. For example, the mobile platform 102 may use the data collected in bands BOX and BOY to compute a value for each pixel in the area of interest using the data collected in band BOX and band BOY. In one embodiment, the computed value is the sum of the reflectance for each material. Since the contribution from the target material 1702 is less than that of the background materials 1902 in the BOX band, and about the same in the BOY band, the target material will have less reflectance than the background materials, and should stand out as an area of pixels with reduced total (sum) reflectance. Similarly, the computed value may be the difference between the data collected in the BOY band and the BOX band, in which case, the areas with the target materials will stand out with areas of pixels with increased total (difference) reflectance. The survey data may be generated by different or additional post-processing as well. Such post-processing may include spectral feature fitting, spectral angle mapping, linear spectral unmixing and matched filtering.

Spectral feature fitting (SFF) is a technique whereby the fit of image spectra is compared to reference spectra using least squares techniques.

Spectral angle mapping (SAM) uses a n-D angle to match pixels to reference spectra. The spectral similarity between two spectra is determined by calculating the angle between the spectra and handling them as vectors in a space with a dimensionality equal to the number of bands. This technique is relatively insensitive to illumination and albedo effects.

Linear spectral unmixing is a technique used to determine the relative abundance of materials that are depicted in multispectral or hyperspectral imagery based on the materials' spectral characteristics. With this technique, the reflectance at each pixel of the image is assumed to be a linear combination of the reflectance of each material (or endmember) present within the pixel. For example, if ¼ of a pixel includes material A, another ¼ of the pixel includes material B, and ½ of the pixel includes material C, the spectrum for that pixel is a weighted average of 0.25 times the spectrum of the material A plus 0.25 times the spectrum of material B, plus 0.5 times the spectrum of material C. Therefore, when the total reflectance spectrum of the sum of the materials and the spectra of materials A, B and C are provided, linear spectral unmixing allows computation the computation of the weighting values for materials A, B, and C (0.25, 0.25, and 0.50) to be computed from the total spectra. Such values for materials reflect the abundance of the materials in the pixel or region of interest 114, and can be computed by the mobile platform 102 and transmitted to the base station 112, rather than being computed in the base station 112. The judicious selection of bands (based on the simulated spectral representation) reduces the processing load on the mobile platform 102 and since only the relative abundances are transmitted to the base station 112, communication link 116 requirements are also reduced.

Matched filtering maximizes the reflectivity of known materials and suppresses the measured reflectivity of the composite background materials so that materials may be detected based on matches to the spectral library 504.

The foregoing operations may be performed in real or near real-time as the mobile platform 102 passes over areas within the region of interest 114. In this embodiment, the selection of the spectral data of the one or more bands takes place continuously while the mobile surveillance platform 102 passes over different portions of the region of interest 114, with each selection being based on the simulated spectral representation of the portion of the region of interest 114 being surveilled.

Hardware Environment

Figure 21:
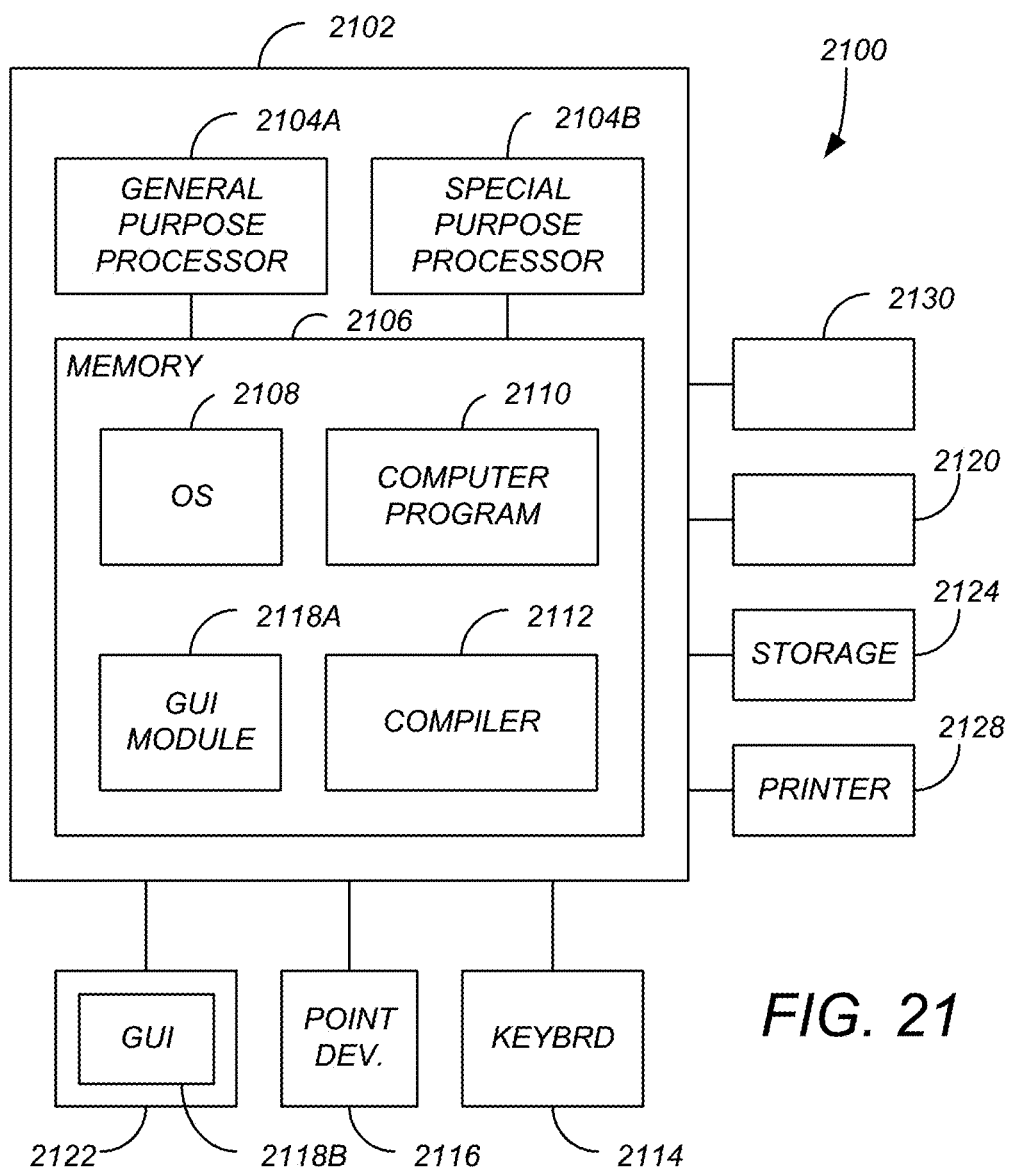
FIG. 21 illustrates an exemplary computer system that may be used to implement processing elements of the above disclosure.

FIG. 21 illustrates an exemplary computer system 2100 that could be used to implement processing elements of the above disclosure, including the mobile surveillance platform 102 and processing elements at the base station 112. The computer 2102 comprises a processor 2104 and a memory, such as random access memory (RAM) 2106. The computer 2102 is operatively coupled to a display 2122, which presents images such as windows to the user on a graphical user interface 2118B. The computer 2102 may be coupled to other devices, such as a keyboard 2114, a mouse device 2116, a printer, etc. Of course, those skilled in the art will recognize that any combination of the above components, or any number of different components, peripherals, and other devices, may be used with the computer 2102.

Generally, the computer 2102 operates under control of an operating system 2108 stored in the memory 2106, and interfaces with the user to accept inputs and commands and to present results through a graphical user interface (GUI) module 2118A. Although the GUI module 2118B is depicted as a separate module, the instructions performing the GUI functions can be resident or distributed in the operating system 2108, the computer program 2110, or implemented with special purpose memory and processors. The computer 2102 also implements a compiler 2112 which allows an application program 2110 written in a programming language such as COBOL, C++, FORTRAN, or other language to be translated into processor 2104 readable code. After completion, the application 2110 accesses and manipulates data stored in the memory 2106 of the computer 2102 using the relationships and logic that was generated using the compiler 2112. The computer 2102 also optionally comprises an external communication device such as a modem, satellite link, Ethernet card, or other device for communicating with other computers.

In one embodiment, instructions implementing the operating system 2108, the computer program 2110, and the compiler 2112 are tangibly embodied in a computer-readable medium, e.g., data storage device 2120, which could include one or more fixed or removable data storage devices, such as a zip drive, floppy disc drive 2124, hard drive, CD-ROM drive, tape drive, etc. Further, the operating system 2108 and the computer program 2110 are comprised of instructions which, when read and executed by the computer 2102, causes the computer 2102 to perform the operations herein described. Computer program 2110 and/or operating instructions may also be tangibly embodied in memory 2106 and/or data communications devices 2130, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of simulating spectral representation of a region of interest, comprising:
   determining a physical characteristic of a geospatial portion of the region of interest, comprising:
      mapping the region of interest to a plurality of geospatial portions, each associated with a physical characteristic; and
      determining the physical characteristic of each of the plurality of geospatial portions;
   associating the determined physical characteristic of each of the geospatial portions with an associated material of a spectral library communicatively coupled to a simulation engine, the spectral library having at least one spectral definition material;
   associating, with a simulation engine, the spectral definition of each associated material of the spectral library with the physical characteristic of the geospatial portion of the region of interest associated with the material, wherein the associated material is at least partially representative of the geospatial portion of the region of interest; and
   generating, with the simulation engine, the simulated spectral representation of the region of interest at least in part from at least the associated spectral definition of the at least one material, comprising:
      fusing the associated spectral definition of the material associated with each of the plurality of geospatial portions into each geospatial portion; and
      generating the simulated spectral representation from the fused associated spectral definitions of the material associated with the geospatial portion for each of the plurality of geospatial portions.

2. The method of claim 1, wherein:
   associating the determined physical characteristic of each of the geospatial portions with the associated material of the spectral library further comprises:
      associating the determined physical characteristic of each of the geospatial portions with an associated second material of the spectral library;
   associating the spectral definition of each associated material of the spectral library with the physical characteristic of the geospatial portion of the region of interest associated with the material, wherein the associated material is at least partially representative of the at least a portion of the region of interest further comprises:
      associating the spectral definition of each associated second material with the physical characteristic of the geospatial geospatial portion of the region of interest, wherein the second material is at least partially representative of the geospatial portion of the region of interest;
   generating the simulated spectral representation of the region of interest at least in part from at least the associated spectral definition of the at least one material comprises:
      generating the simulated spectral representation of the region of interest at least in part from the spectral definition of the material and the spectral definition of the second material.

3. The method of claim 2, wherein:
   the method further comprises:
      determining a second physical characteristic of a second geospatial portion of the region of interest;
      associating the second determined physical characteristic with a third material of the spectral library, the spectral library further having at least one spectral definition of the third material;
associating the spectral definition of the third material with the second geospatial portion of the region of interest, wherein the third material is at least partially representative of the region of interest;
generating the simulated spectral representation of the region of interest at least in part from the spectral definition of the material and the spectral definition of the second material comprises:
generating the simulated spectral representation of the region of interest at least in part from the spectral definition of the material, the spectral definition of the second material, and the spectral definition of the third material.

4. The method of claim 2, wherein generating the simulated spectral representation of the region of interest at least in part from the spectral definition of the at least one material and the spectral definition of the second material comprises:
weighting the spectral definition of the at least one material according to a first weight;
weighting the spectral definition of the second material according to a second weight; and
generating the simulated spectral representation of the region of interest at least in part from the weighted spectral definition of the at least one material and the weighted spectral definition of the second material.

5. The method of claim 3, wherein generating the simulated spectral representation of the region of interest at least in part from the spectral definition of the at least one material and the spectral definition of the second material comprises:
weighting the spectral definition of the material according to a first weight;
weighting the spectral definition of the second material according to a second weight;
generating a combined spectral definition of the material and the second material at least in part from the weighted spectral definition of the material and the weighted spectral definition of the second material;
weighting the spectral definition of the third material according to a fourth weight;
weighting the combined spectral definition according to a third weight; and
generating the simulated spectral representation of the region of interest at least in part from the weighted spectral definition of the third material and the weighted combined spectral definition.

6. The method of claim 1, wherein:
associating the determined physical characteristic of each of the geospatial portions with an associated material of the spectral library comprises:
associating the determined physical characteristic of each of the geospatial portions with a plurality of materials of the spectral library;
associating the spectral definition of each associated material of the spectral library with the physical characteristic of the geospatial portion of the region of interest associated with the material comprises:
associating the spectral definition of each of the plurality of associated materials of the spectral library with the physical characteristic of the geospatial portion associated with the materials;
fusing the associated spectral definition of the material associated with each of the plurality of geospatial portions into each associated geospatial region comprises:

fusing the spectral definitions associated with each material associated with each of the plurality of geospatial portions into each associated geospatial portion; and
generating the simulated spectral representation from the fused associated spectral definitions of the material associated the geospatial portion for each of the plurality of geospatial portions comprises:
generating the simulated spectral representation from the fused associated spectral definitions of each material associated the geospatial portion for each of the plurality of geospatial portions.

7. The method of claim 6, wherein:
fusing the spectral definitions associated with each material associated with each of the plurality of geospatial portions into each associated geospatial portion comprises:
weighting each of the spectral definitions associated with each material; and
fusing the weighted spectral definitions associated with each material into each associated geospatial portion.

8. An apparatus for generating a simulated spectral representation of a region of interest, comprising:
a processor;
a memory, communicatively coupled to the processor, the memory storing instructions comprising:
determining a physical characteristic of a geospatial portion of the region of interest, comprising:
mapping the region of interest to a plurality of geospatial portions, each associated with a physical characteristic; and
determining the physical characteristic of each of the plurality of geospatial portions:
associating the determined physical characteristic of each of the geospatial portions with an associated material of a spectral library, the spectral library having at least one spectral definition material;
associating the spectral definition of each associated material of the spectral library with the physical characteristic of the geospatial portion of the region of interest associated with the material, wherein the associated material is at least partially representative of the geospatial portion of the region of interest; and
generating the simulated spectral representation of the region of interest at least in part from at least the associated spectral definition of the at least one material, comprising:
fusing the associated spectral definition of the material associated with each of the plurality of geospatial portions into each geospatial portion; and
generating the simulated spectral representation from the fused associated spectral definitions of the material associated with the geospatial portion for each of the plurality of geospatial portions.

9. The apparatus of claim 8, wherein:
the instructions for associating the determined physical characteristic of each of the geospatial portions with the associated material of the spectral library further comprise instructions for:
associating the at determined physical characteristic of each of the geospatial portions with an associated second material of the spectral library;
the instructions for associating the spectral definition of each associated material of the spectral library with the physical characteristic of the geospatial portion of the region of interest associated with the material, wherein the associated material is at least partially representative of the at least a portion of the region of interest further comprise instructions for:
    associating the spectral definition of each associated second material with the physical characteristic of the geospatial portion of the region of interest, wherein the second material is at least partially representative of the geospatial portion of the region of interest;
the instructions for generating the simulated spectral representation of the region of interest at least in part from at least the associated spectral definition of the at least one material comprise instructions for:
    generating the simulated spectral representation of the region of interest at least in part from the spectral definition of the material and the spectral definition of the second material.

10. The apparatus of claim 9, wherein:
the instructions further comprise instructions for:
    determining a second physical characteristic of a second geospatial portion of the region of interest;
    associating the second determined physical characteristic with a third material of a spectral library, the spectral library further having at least one spectral definition of the third material; and
    associating the spectral definition of the third material with the second geospatial portion of the region of interest, wherein the third material is at least partially representative of the region of interest;
the instructions for generating the simulated spectral representation of the region of interest at least in part from the spectral definition of the material and the spectral definition of the second material comprise instructions for:
    generating the simulated spectral representation of the region of interest at least in part from the spectral definition of the material, the spectral definition of the second material, and the spectral definition of the third material.

11. The apparatus of claim 9, wherein the instructions for generating the simulated spectral representation of the region of interest at least in part from the spectral definition of the at least one material and the spectral definition of the second material comprise instructions for:
    weighting the spectral definition of the at least one material according to a first weight;
    weighting the spectral definition of the second material according to a second weight; and
    generating the simulated spectral representation of the region of interest at least in part from the weighted spectral definition of the at least one material and the weighted spectral definition of the second material.

12. The apparatus of claim 10, wherein the instructions for generating the simulated spectral representation of the region of interest at least in part from the spectral definition of the at least one material and the spectral definition of the second material comprise instructions for:
    weighting the spectral definition of the material according to a first weight;
    weighting the spectral definition of the second material according to a second weight;
    generating a combined spectral definition of the material and the second material at least in part from the weighted spectral definition of the material and the weighted spectral definition of the second material;
    weighting the spectral definition of the third material according to a fourth weight;
    weighting the combined spectral definition according to a third weight; and
    generating the simulated spectral representation of the region of interest at least in part from the weighted spectral definition of the third material and the weighted combined spectral definition.

13. The apparatus of claim 8, wherein:
the instructions for associating the determined physical characteristic of each of the geospatial portions with an associated material of the spectral library comprise instructions for:
    associating the determined physical characteristic of each of the geospatial portions with a plurality of materials of the spectral library;
the instructions for associating the spectral definition of each associated material of the spectral library with the physical characteristic of the geospatial portion associated with the material comprise:
    instructions for associating the spectral definition of each of the plurality of associated materials of the spectral library with the physical characteristic of the geospatial portion associated with the materials;
the instructions for fusing the associated spectral definition of the material associated with each of the plurality of geospatial portions into each associated geospatial region comprise instructions for:
    fusing the spectral definitions associated with each material associated with each of the plurality of geospatial portions into each associated geospatial portion;
the instructions for generating the simulated spectral representation from the fused associated spectral definitions of the material associated the geospatial portion for each of the plurality of geospatial portions comprise instructions for:
    generating the simulated spectral representation from the fused associated spectral definitions of each material associated the geospatial portion for each of the plurality of geospatial portions.

14. The apparatus of claim 13, wherein:
the instructions for fusing the spectral definitions associated with each material associated with each of the plurality of geospatial portions into each associated geospatial portion comprise instructions for:
    weighting each of the spectral definitions associated with each material; and
    fusing the weighted spectral definitions associated with each material into each associated geospatial portion.

15. An apparatus for simulating spectral representation of a region of interest, comprising:
    means for determining a physical characteristic of a geospatial portion of the region of interest, comprising:
        means for mapping the region of interest to a plurality of geospatial portions, each associated with a physical characteristic; and
        means for determining the physical characteristic of each of the plurality of geospatial portions
    means for associating the determined physical characteristic of each of the geospatial portions with an associated material of a spectral library, the spectral library having at least one spectral definition material;
    means for associating the spectral definition of each associated material of the spectral library with the physical characteristic of the geospatial portion of the region of interest associated with the material, wherein the associated material is at least partially representative of the geospatial portion of the region of interest; and means for generating a simulated spectral representation the region of interest at least in part from at least the associated spectral definition of the at least one material; comprising:
   means for fusing the associated spectral definition of the material associated with each of the plurality of geospatial portions into each geospatial portion; and
   means for generating the simulated spectral representation from the fused associated spectral definitions of the material associated with the geospatial portion for each of the plurality of geospatial portions.

16. The apparatus of claim 15, wherein:
the means for associating the determined physical characteristic of each of the geospatial portions with an associated material of the spectral library comprises:
   means for associating the determined physical characteristic of each of the geospatial portions with a plurality of materials of the spectral library;
the means for associating the spectral definition of each associated material of the spectral library with the physical characteristic of the geospatial portion of the region of interest associated with the material comprises:
   means for associating the spectral definition of each of the plurality of associated materials of the spectral library with the physical characteristic of the geospatial portion associated with the materials;
the means for fusing the associated spectral definition of the material associated with each of the plurality of geospatial portions into each associated geospatial region comprises:
   means for fusing the spectral definitions associated with each material associated with each of the plurality of geospatial portions into each associated geospatial portion; and
the means for generating the simulated spectral representation from the fused associated spectral definitions of the material associated the geospatial portion for each of the plurality of geospatial portions comprises:
   means for generating the simulated spectral representation from the fused associated spectral definitions of each material associated the geospatial portion for each of the plurality of geospatial portions.

17. The apparatus of claim 16, wherein:
the means for fusing the spectral definitions associated with each material associated with each of the plurality of geospatial portions into each associated geospatial portion comprises:
   means for weighting each of the spectral definitions associated with each material; and
   means for fusing the weighted spectral definitions associated with each material into each associated geospatial portion.

* * * * *